United States Patent
Lee et al.

(10) Patent No.: US 10,360,468 B2
(45) Date of Patent: Jul. 23, 2019

(54) METHOD FOR IDENTIFYING LOCATION OF ELECTRONIC APPARATUS, ELECTRONIC APPARATUS, AND OPERATING METHOD OF SERVER

(71) Applicant: Samsung Electronics Co., Ltd., Suwon-si, Gyeonggi-do (KR)

(72) Inventors: Hee-Kuk Lee, Suwon-si (KR); Min-Kyung Hwang, Seoul (KR); Jin-He Jung, Suwon-si (KR); Ik-Hwan Cho, Suwon-si (KR); Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 14/970,909

(22) Filed: Dec. 16, 2015

(65) Prior Publication Data

US 2016/0189365 A1 Jun. 30, 2016

(30) Foreign Application Priority Data

Dec. 26, 2014 (KR) ........................ 10-2014-0190397

(51) Int. Cl.
| | | |
|---|---|---|
| *G06K 9/00* | (2006.01) | |
| *G06K 9/46* | (2006.01) | |
| *G06F 16/583* | (2019.01) | |
| *G06T 7/73* | (2017.01) | |

(Continued)

(52) U.S. Cl.
CPC .......... *G06K 9/46* (2013.01); *G06F 16/5854* (2019.01); *G06K 9/00664* (2013.01); *G06K 9/3258* (2013.01); *G06T 7/73* (2017.01); *G01S 5/0257* (2013.01); *G06K 2209/27* (2013.01);
(Continued)

(58) Field of Classification Search
CPC ... G01S 5/0257; G06F 17/30259; G06K 9/46; G06T 2207/10032; G06T 2207/30244; G06T 7/004; G06T 7/0081; G06T 7/73
See application file for complete search history.

(56) References Cited

U.S. PATENT DOCUMENTS

| | | | |
|---|---|---|---|
| 8,131,118 B1* | 3/2012 | Jing | G01C 21/20 382/305 |
| 8,509,488 B1* | 8/2013 | Enge | G01C 21/3623 382/106 |
| 9,253,607 B2* | 2/2016 | Ling | H04W 4/043 |

(Continued)

FOREIGN PATENT DOCUMENTS

| | | |
|---|---|---|
| CN | 101000372 A | 7/2007 |
| CN | 101013438 A | 8/2007 |
| CN | 101055190 A | 10/2007 |

OTHER PUBLICATIONS

Chinese Office Action dated May 29, 2019, issued in a counterpart Chinese application No. 201510994366.X.

*Primary Examiner* — Tom Y Lu
(74) *Attorney, Agent, or Firm* — Jefferson IP Law, LLP

(57) ABSTRACT

A method of identifying a location of an electronic apparatus is provided. The method includes obtaining information about a region in which the electronic apparatus is located, obtaining an image through an image sensor included in the electronic apparatus, identifying location information about one or more objects included in the image, and identifying a location of the electronic apparatus by using the information about the region and the location information.

19 Claims, 15 Drawing Sheets

(51) Int. Cl.
*G06K 9/32* (2006.01)
*G01S 5/02* (2010.01)

(52) U.S. Cl.
CPC ............... *G06T 2207/10032* (2013.01); *G06T 2207/30244* (2013.01)

(56) References Cited

U.S. PATENT DOCUMENTS

| | | | |
|---|---|---|---|
| 9,693,198 B2 * | 6/2017 | Ling | H04W 4/026 |
| 2013/0045751 A1 | 2/2013 | Chao et al. | |
| 2013/0157682 A1 | 6/2013 | Ling | |

* cited by examiner

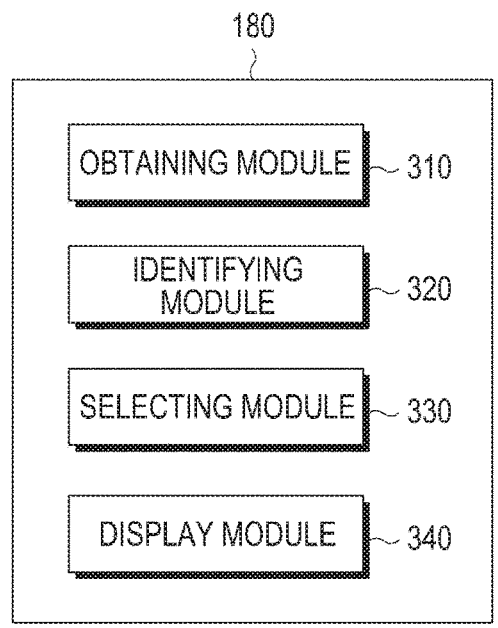
FIG.3
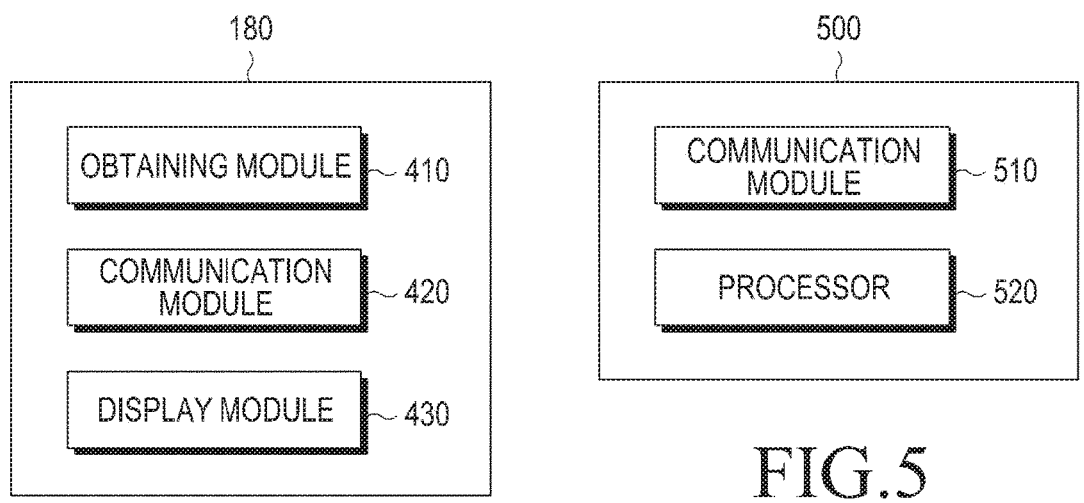
FIG.4
FIG.5

METHOD FOR IDENTIFYING LOCATION OF ELECTRONIC APPARATUS, ELECTRONIC APPARATUS, AND OPERATING METHOD OF SERVER

CROSS-REFERENCE TO RELATED APPLICATION(S)

This application claims the benefit under 35 U.S.C. § 119(a) of a Korean patent application filed on Dec. 26, 2014 in the Korean Intellectual Property Office and assigned Serial number 10-2014-0190397, the entire disclosure of which is hereby incorporated by reference.

TECHNICAL FIELD

The present disclosure relates to a method of identifying a location of an electronic apparatus.

BACKGROUND

Electronic apparatuses, for example, a smart phone, a wearable device, a laptop, and a personal digital assistant (PDA), have various characteristics, which have been improved, for identifying current geological and/or geographical locations thereof. A method of using a global positioning system (GPS) using a reaching time, i.e., a propogation time, of an electronic wave considering a location of an artificial satellite, a method of estimating a location by using ZIGBEE, WiFi, radio frequency identification (RFID), and the like may be used for identifying a location of the electronic apparatus. Further, a simultaneous localization and map-building (SLAM), in which a robot builds an autonomous map for an environment while moving by itself without outside assistance by using an embedded sensor in an unknown environment, and estimates a location, may also be used for identifying a location of the electronic apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of using the GPS for identifying a location of the electronic apparatus has a problem in that accuracy is decreased due to reflection and diffraction of electronic waves in a city environment including many high-rise buildings. Further, the method of using the GPS cannot be used for identifying a location of the electronic apparatus at an indoor site or an underground.

The method of estimating a location by using the ZIGBEE, WiFi, and radio frequency identification (RFID) may be used at an indoor site. However, apparatuses using the ZIGBEE, WiFi, and RFID need to be installed within a communication distance. Accordingly, in order to estimate a location of the electronic apparatus, large costs for installing and managing the apparatuses using the ZIGBEE, WiFi, and RFID are involved.

Further, in a simultaneous localization and map-building (SLAM) method, it is difficult to obtain relative distance information about an object and convert the relative distance information about the object into an absolute location, so that the SLAM method is difficult to be used as the method of identifying a location of the electronic apparatus.

The present disclosure is conceived to solve the aforementioned problems, and a technical object to be solved by the present disclosure is to provide a method of identifying a location of an electronic apparatus by using an obtained image.

In accordance with an aspect of the present disclosure, a method of identifying a location of an electronic apparatus is provided. The method includes obtaining information about a region in which the electronic apparatus is located, obtaining an image through an image sensor included in the electronic apparatus, identifying location information about one or more objects included in the image, and identifying a location of the electronic apparatus by using the information about the region and the location information.

In accordance with another aspect of the present disclosure, an electronic apparatus is provided. The electric apparatus includes a communication module configured to obtain information about a region in which the electronic apparatus is located, an image sensor configured to obtain an image, and a processor configured to identify location information about one or more objects included in the image, and identify a location of the electronic apparatus by using the information about the region and the location information.

In accordance with another aspect of the present disclosure, a method of identifying a location of an electronic apparatus is provided. The method includes obtaining an image through an image sensor included in the electronic apparatus, transmitting the obtained image to a server, receiving a location of the electronic apparatus, identified based on location information about one or more objects selected in the image, from the server, and displaying the location of the electronic apparatus.

In accordance with another aspect of the present disclosure, an operating method of a server for identifying a location of an electronic apparatus is provided. The method includes receiving an image from the electronic apparatus, identifying location information about one or more objects included in the image, identifying a location of the electronic apparatus by using information about a region in which the electronic apparatus is located and the location information, and transmitting the identified location of the electronic apparatus to the electronic apparatus.

According to various embodiments of the present disclosure, it is possible to identify a location of an electronic apparatus in a high building, an indoor site, underground, or in other similar locations in which it is difficult to identify a location of the electronic apparatus through a GPS and the like.

Further, according to various embodiments of the present disclosure, it is possible to identify a location of an electronic apparatus by using an image sensor of the electronic apparatus without installing a separate sensor or device for identifying a location of the electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a block diagram illustrating a location identifying module of an electronic apparatus according to various embodiments of the present disclosure;

FIG. 4 is a block diagram illustrating a location identifying module of an electronic apparatus according to various embodiments of the present disclosure;

FIG. 5 is a block diagram of a server according to various embodiments of the present disclosure;

Throughout the drawings, it should be noted that like reference numbers are used to depict the same or similar elements, features, and structures.

DETAILED DESCRIPTION

Figure 1:
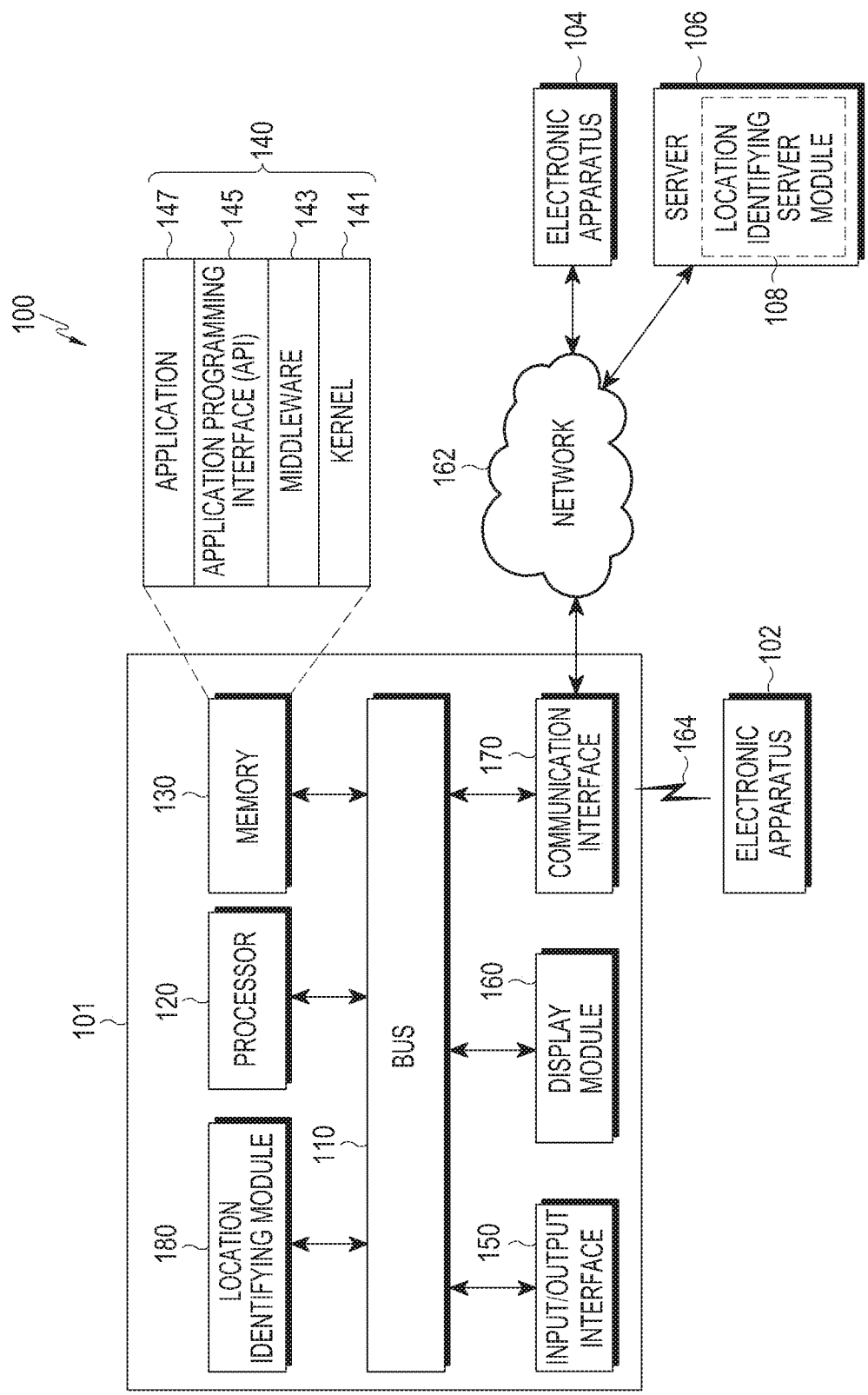
FIG. 1 illustrates a network environment including an electronic apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "a first", "a second", "the first", or "the second" used in various embodiments of the present disclosure may modify various components regardless of the order and/or the importance but does not limit the corresponding components. The expressions may be used to distinguish a component element from another component element. For example, a first user device and a second user device may indicate different user devices regardless of the sequence or importance thereof. For example, a first element may be termed a second element, and similarly, a second element may be termed a first element without departing from the scope of the present disclosure.

When it is mentioned that one element, e.g., a first element, is "operatively or communicatively coupled with/to or connected to" another element, e.g., a second element, it should be construed that the one element is directly connected to the another element or the one element is indirectly connected to the another element via yet another element, e.g., a third element. Conversely, when it is mentioned that one element, e.g., a first element, is "directly coupled" or "directly connected" to another element, e.g., a second element, it may be construed that yet another element does not exist between the one element and the another element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted or configured to perform A, B, and C" may mean a dedicated processor, e.g. embedded processor, only for performing the corresponding operations or a generic-purpose processor, e.g., a central processing unit (CPU) or application processor (AP), that can perform the corresponding operations by executing one or more software programs stored in a memory device.

The terms used in the present disclosure are only used to describe specific embodiments, and are not intended to limit the present disclosure. As used herein, the singular forms may include the plural forms as well, unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device, e.g., a head-mounted-device (HMD) such as electronic glasses, electronic clothes, an electronic bracelet, an electronic necklace, an electronic appcessory, electronic tattoos, or a smart watch.

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box, e.g., Samsung HomeSync™, Apple TV™, or Google TV™, a game console, e.g., Xbox™ and PlayStation™, an electronic dictionary, an electronic key, a camcorder, and an electronic photo frame.

According to another embodiment, the electronic device may include at least one of various medical devices, e.g., various portable medical measuring devices, such as a blood glucose monitoring device, a heart rate monitoring device, a blood pressure measuring device, a body temperature measuring device, etc., a magnetic resonance angiography (MRA), a magnetic resonance imaging (MRI), a computed tomography (CT) machine, and an ultrasonic machine, a navigation device, a global positioning system (GPS) receiver, an event data recorder (EDR), a flight data recorder (FDR), a vehicle infotainment device, electronic devices for a ship, e.g., a navigation device for a ship, and a gyrocompass, avionics, security devices, an automotive head unit, a robot for home or industry, an automatic teller machine (ATM) in banks, point of sales (POS) devices in a shop, or internet device of things, e.g., a light bulb, various sensors, electric or gas meter, a sprinkler device, a fire alarm, a thermostat, a streetlamp, a toaster, a sporting goods, a hot water tank, a heater, a boiler, etc.

According to some embodiments, the electronic device may include at least one of a part of furniture or a building/structure, an electronic board, an electronic signature receiving device, a projector, and various kinds of measuring instruments, e.g., a water meter, an electric meter, a gas meter, and a radio wave meter. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. In the present disclosure, the term "user" may indicate a person using an electronic device or a device, e.g. an artificial intelligence electronic device, using an electronic device.

FIG. 1 illustrates a network environment including an electronic apparatus according to various embodiments of the present disclosure.

Referring to FIG. 1, an electronic apparatus 101 is provided within a network environment 100 in various embodiments. The electronic apparatus 101 may include a bus 110, a processor 120, a memory 130, an input/output interface 150, a display 160, a communication interface 170, and a location identifying module 180. In one embodiment, at least one element among the elements may be omitted in the electronic apparatus 101 or another element may be added to the electronic apparatus 101.

The bus 110 may connect, for example, the elements 120 to 180 with each other, and include a circuit for transmitting communication, for example, a control message and/or data, between the elements.

The processor 120 may include one or more among a CPU, an AP, and a communication processor (CP). The processor 120 may execute, for example, calculation or data processing for control and/or communication of one or more other elements of the electronic apparatus 101. The processor 120 may be called a controller, or include the controller as a part thereof.

The memory 130 may include a volatile and/or nonvolatile memory. The memory 130 may store, for example, a command or data related to one or more other elements of the electronic apparatus 101. According to various embodiments, the memory 130 may store software and/or a program 140. The program 140 may include, for example, a kernel 141, middleware 143, an application programming interface (API) 145, and/or an application program or "application" 147. At least a part of the kernel 141, the middleware 143, and the API 145 may be referred to as an operating system (OS).

The kernel 141 may control or manage system resources, for example, the bus 110, the processor 120, and the memory 130, used for executing an operation or a function implemented in other programs, for example, the middleware 143, the API 145, and the application 147. Furthermore, the kernel 141 may provide an interface through which the middleware 143, the API 145, or the application 147 access individual components of the electronic apparatus 101 to control or manage system resources.

The middleware 143 may serve as, for example, an intermediary such that the API 145 or the applications 147 communicates with the kernel 141 to transmit and/or receive data. Furthermore, in regard to task requests received from the application 147, the middleware 143 may perform a control, e.g., scheduling or load balancing, for the task requests using, for example, a method of assigning a priority for using the system resources, e.g., the bus 110, the processor 120, and the memory 130, of the electronic apparatus 101 to at least one of the application programs 147.

The API 145 is an interface through which the application 147 controls functions provided by the kernel 141 and the middleware 143, and may include at least one interface or function, e.g., a command, for file control, window control, image processing, or text control.

According to various embodiments of the present disclosure, the application may be called an application program.

The input/output interface 150 may serve as an interface for transmitting a command or data input from a user or another external device to another element of the electronic apparatus 101. Further, the input/output interface 150 may output a command or data received from other elements of the electronic apparatus 101 to a user or another external device.

The display 160 may include, for example, a liquid crystal display (LCD), a light emitting diode (LED) display, an organic light emitting diode (OLED) display, a microelectromechanical systems (MEMS) display, or an electronic paper display. The display 160 may display, for example, various contents, for example, text, an image, a video, an icon, or a symbol, to a user. The display 160 may include a touch screen, and for example, receive a touch, a gesture, a proximity, or a hovering input by using an electronic pen or a part of a body of a user.

The communication interface 170 may establish communication between the electronic apparatus 101 and an external apparatus, for example, an electronic apparatus 102, which may be referred to as a first external apparatus 102, an electronic apparatus 104, which may be referred to as a second external electronic apparatus 104, or a server 106. For example, the communication interface 170 may be connected with a network 162 through wireless or wired communication to communicate with the external apparatus, for example, the second external electronic apparatus 104 or the server 106.

Here, the first external electronic apparatus 102 may be, for example, a beacon. The first external electronic apparatus 102 may transmit a beacon signal 164 at a predetermined time interval. The first external electronic apparatus 102 may transmit the beacon signal 164 based on various communication protocols, such as Bluetooth, Wifi, and ANT.

Otherwise, the wireless communication may use at least one of, for example, long term evolution (LTE), LTE-advanced (LTE-A), code division multiple access (CDMA), wideband CDMA (WCDMA), universal mobile telephone system (UMTS), WiBro, and global system/standard for mobile communication (GSM). The wired communication may include at least one of, for example, a universal serial bus (USB), a high definition multimedia interface (HDMI), recommended standard-232 (RS-232), and a plain old telephone service (POTS). The network 162 may include at least one of communication networks, for example, a computer network, for example, a local area network (LAN) or a wide area network (WAN), the Internet, and a telephone network.

Each of the first and second external electronic apparatuses 102 and 104 may be the same as or different from the kind of the electronic apparatus 101. According to various embodiments, the server 106 may include a group of one or more servers. According to various embodiments, the entirety or a part of the operations executed in the electronic apparatus 101 may be executed in the other or a plurality of electronic apparatuses, for example, the electronic apparatuses 102 and 104, or the server 106. According to various embodiments, when the electronic apparatus 101 needs to perform a specific function or service automatically or according to a request, the electronic apparatus 101 may request at least a partial function associated with the specific function or service from another apparatus, for example, the electronic apparatuses 102 and 104, or the server 106, instead of or in addition to the autonomous execution of the function or the service. Other electronic apparatuses, for example, the electronic apparatuses 102 and 104, or the server 106, may execute the requested function or the additional function, and transmit a result of the execution to the electronic apparatus 101. The electronic apparatus 101 may provide the requested function or service by processing the received result as it is or additionally processing the received result. To this end, for example, cloud computing, distribution computing, or client-server computing techniques may be used.

According to various embodiments, the location identifying module 180 may support driving of the electronic apparatus 101 by performing at least one of the operations or functions implemented by the electronic apparatus 101. For example, the server 106 may include a location identifying server module 108 capable of supporting the location identifying module 180 implemented in the electronic apparatus 101. For example, the location identifying server module 108 may include one or more elements of the location identifying module 180 to perform one or more operations among the operations performed by the location identifying module 180, for example, act for the location identifying module 180.

The location identifying module 180 may process at least some of the information obtained from other elements, for example, at least one of the processor 120, the memory 130, the input/output interface 150, and the communication interface 170, and utilize the same in various manners. For example, the location identifying module 180 may control at least some functions of the electronic apparatus 101 by using the processor 120 or independently therefrom so that the electronic apparatus 101 may interwork with other electronic apparatuses, for example, the electronic apparatus 104 or the server 106. The location identifying module 180 may be integrated to the processor 120 or the communication interface 170. According to various embodiment, at least one of the location identifying module 180 may be included in the server 106, for example, the location identifying server module 108, and receive a support of at least one operation implemented by the location identifying module 180.

Figure 2:
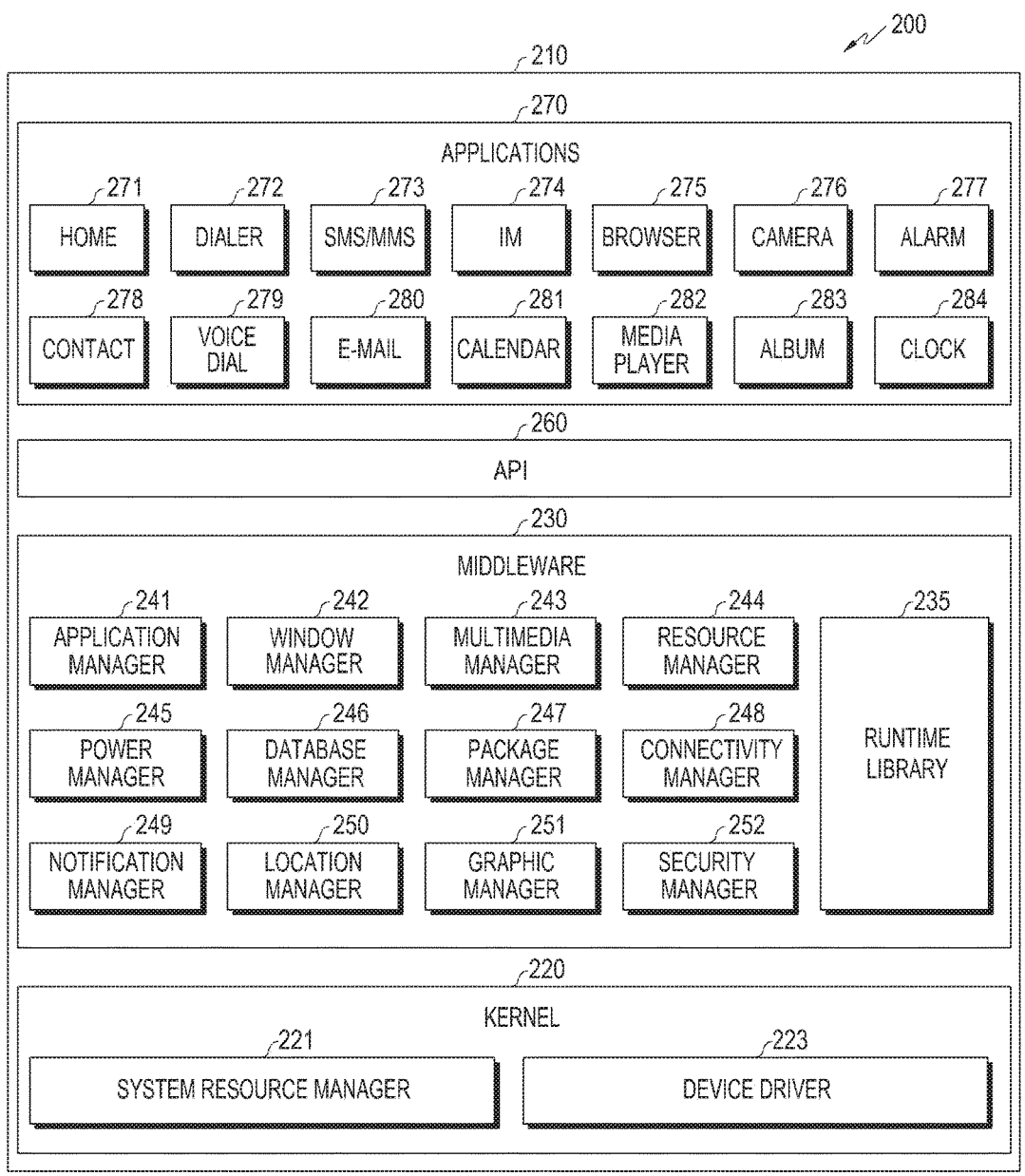
FIG. 2 is a block diagram illustrating a program module according to various embodiments of the present disclosure.

FIG. 2 is a block diagram illustrating a program module according to various embodiments of the present disclosure.

Referring to FIG. 2, a block diagram 200 illustrating a program module 210 according to various embodiments of the present disclosure is shown. According to various embodiment, the program module 210, for example, the program 140, may include an OS for controlling resources related to the electronic apparatus 101, and/or various applications, for example, the application program 147, driven on the OS. For example, the OS may be Android, iOS, Windows, Symbian, Tizen, or Bada.

The programming module 210 may include a kernel 220, middleware 230, an API 260, and/or applications 270. At least a part of the program module may be preloaded on the electronic apparatus or downloaded from a server, for example, the server 106.

The kernel 220, for example, the kernel 141 of FIG. 1, may include, for example, a system resource manager 221 or a device driver 223. The system resource manager 221 may perform control, allotment or collection of the system resources. According to various embodiments, the system resource manager 221 may include, although not shown, a process management unit, a memory management unit, a file system management unit, and the like. The device driver 223 may include, for example, a display driver, a camera driver, a Bluetooth driver, a shared memory driver, a USB driver, a keypad driver, a WiFi driver, an audio driver, or an interprocess communication (IPC) driver.

The middleware 230 may provide, for example, a function commonly requested by the application 270 or various functions so that the application 270 may efficiently use the limited system resources within the electronic apparatus to the application 270 through the API 260. According to various embodiments, the middleware 230, for example, the middleware 143, may include at least one of a run time library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The run time library 235 may include, for example, although not shown, a library module which a compiler uses in order to add new functions through a programming language while the application 270 is executed. The run time library 235 may perform a function for input/output management, memory management, or a calculation function.

The application manager 241 may manage, for example, a life cycle of at least one application among the applications 270. The window manager 242 may manage a GUI resource used in a screen. The multimedia manager 243 may detect a format required for reproducing various media files and perform an encoding or a decoding of a media file by using a codec suitable for the corresponding format. The resource manager 244 may manage resources, such as a source code, a memory, or a storage space, of at least one application among the applications 270.

The power manager 245 may manage a battery or power by operating together with a basic input/output system (BIOS), and provide power information required for the operation of the electronic apparatus. The database manager 246 may generate, search for, or change a database to be used in at least one application among the applications 270. The package manager 247 may manage the installation or the updating of an application distributed in the form of package file.

The connectivity manager 248 may manage a wireless connection of, for example, Wi-Fi or Bluetooth. The notification manager 249 may display or notify an event, such as a received message, an appointment, and a proximity notification, to a user without disturbance. The location manager 250 may manage location information of the electronic apparatus. The graphic manager 251 may manage graphic effects to be provided to a user and user interfaces related to the graphic effects. The security manager 252 may provide various security functions required for system security or user authentication. According to various embodiments, when the electronic apparatus, for example, the electronic apparatus 101, includes a telephone function, the middleware 230 may further include a telephony manager for managing a voice or video call function of the electronic apparatus.

The middleware 230 may include a middleware module forming a combination of various functions of the aforementioned elements. The middleware 230 may provide a specialized module for each type of OS in order to provide a differentiated function. In addition, some exiting component elements may be dynamically removed from the middleware 230, or new component elements may be added to the middleware 330.

The API 260, for example, the API 145, is a set of API programming functions, and may be provided in different configurations according to the OS. For example, in the Android or the iOS, one API set may be provided for each platform, and in the Tizen, two or more API sets may be provided for each platform.

The application 270, for example, the application program 147, may include one or more applications for providing a function of, for example, home 271, a dialer 272, a short message service/multimedia message service (SMS/MMS) 273, an instant message (IM) 274, a browser 275, a camera 276, an alarm 277, a contact 278, a voice dial 279, an e-mail 280, a calendar 281, a media player 282, an album 283, a clock 284, a health care (not shown), for example, measurement of an exercise quantity or blood sugar, or an environment information provision (not shown), for example, provision of air pressure, humidity, or temperature information.

According to various embodiments, the application 270 may include an application, hereinafter, for convenience of description, an "information exchange application", for supporting information exchange between the electronic apparatus, for example, the electronic apparatus 101, and the external electronic apparatus, for example, the electronic apparatuses 102 and 104. The information exchange application may include, for example, a notification relay application for transmitting specific information to the external electronic apparatus, or a device management application for managing the external electronic apparatus.

For example, the notification relay application may include a function of transferring notification information generated from other applications of the electronic apparatus 101, e.g., an SMS/MMS application, an e-mail application, a health management application, an environmental information application, and the like, to the external electronic apparatus, e.g., the electronic apparatuses 102 and 104. Further, the notification relay application may, for example, receive notification information from the external electronic apparatus and provide a user with the received notification information. The device management application may manage at least one function, for example, turn-on/turn-off of the external electronic apparatus itself or some constituent components, or adjustment of brightness or resolution of a display, of the external electronic apparatus, for example, the electronic apparatuses 102 and 104, communicating with the electronic apparatus, and manage, for example, install, delete, or update, an application operated in the external electronic apparatus, or a service provided from an the external electronic apparatus, e.g., a call service or a message service.

According to various embodiments, the application 270 include a designated application according to an attribute, for example, the kind of electronic apparatus is a mobile medical device, of the external electronic apparatus, for example, the external electronic apparatuses 102 and 104. According to various embodiments, the application 270 may include an application received from the external electronic apparatus, for example, the server 106 or the external electronic apparatuses 102 and 104. According to various embodiments, the application 270 may include a preloaded application or a third party application downloadable from the server. Names of the elements of the program module 210 according to the illustrated embodiment may be varied according to the kind of OS.

According to various embodiments, at least a part of the program module 210 may be formed of software, firmware, or hardware, or a combination of two or more of software, firmware, and hardware. At least a part of the program module 210 may be implemented, for example, executed, by, for example, the processor 210, for example, the AP 210. At least a part of the program module 210 may include, for example, a module, a program, a routine, sets of instructions, or a process for performing one or more functions.

FIG. 3 is a block diagram illustrating the location identifying module of the electronic apparatus according to various embodiments of the present disclosure.

Referring to FIG. 3, the location identifying module 180 of the electronic apparatus, according to various embodiments of the present disclosure, may include at least some or all of an obtaining module 310, an identifying module 320, a selecting module 330, and a display module 340. The location identifying module 180 may be provided independently from the processor, for example, the processor 120, or the entirety or a part of the location identifying module 180 may be integrated to the processor.

The obtaining module 310 according to various embodiments of the present disclosure may obtain information about a region in which the electronic apparatus 101 is located. For example, the electronic apparatus 101 may obtain information about the identified region from a server 500 (see FIG. 5). Further, when the information about the identified region is stored in the memory 130 of the electronic apparatus 101, the electronic apparatus 101 may obtain the information about the identified region from the memory 130.

The obtaining module 310 according to various embodiments of the present disclosure may obtain an image through an image sensor (not shown), for example, a camera, of the electronic apparatus 101. In order to identify a location, the user may photograph a neighboring environment through the image sensor 101 in real time. The image may be a single image or a plurality of images for the neighboring environment. For example, the image may be a panoramic image formed of a plurality of continuous images.

The identifying module 320, according to various embodiments of the present disclosure, may identify location information about one or more objects included in the obtained image. The identifying module 320 may identify location information about one or more objects based on a location of each of the one or more objects on the image and an intrinsic parameter of the image sensor. In various embodiments, location information about one or more objects may include at least one of a location of each of the one or more objects and a location relation between the one or more objects.

For example, the identifying module 320 may identify a location of at least one object by using a focal length, a principal point, i.e., image coordinates of a point at which an optical axis meets the image sensor, or an asymmetric coefficient, i.e., a degree of inclination of the image sensor, included in the intrinsic parameter of the image sensor. The identifying module 320 may identify a location relation between the one or more objects based on a location of each of the one or more objects.

The identifying module 320 according to various embodiments of the present disclosure may identify a location of the electronic apparatus 101 by using the information about the region and the location information about the one or more objects. For example, the identifying module 320 may compare the information about the region and the location information about the one or more objects. The identifying module 320 may identify a location of the electronic apparatus 101 based on a result of the comparison.

In various embodiments, the identifying module 320 may identify a region, in which the electronic apparatus 101 is located, based on one or more signals transmitted and/or received between the electronic apparatus 101 and a base station. The electronic apparatus 101 may periodically transmit and/or receive a signal with a base station through a communication means, for example, the communication interface 170. The identifying module 320 may identify the region, in which the electronic apparatus 101 is located, or an approximate radius range, in which the electronic apparatus 101 is located, based on the signal periodically transmit and/or received with the base station.

In various embodiments, the information about the region may include at least one of map data corresponding to the region and point of interest (POI) information included in the map data. For example, the POI information may represent information about a main facility, a station, an airport, a terminal, a building, a store, and the like included in the map data. The POI information may contain location information or image information about a main facility, a terminal, a building, a store, and the like.

In various embodiments, the selecting module 330 may select the one or more objects from entire objects, or in other words, from an entirety of objects, extracted from the image based on the information about the region. The selecting module 330 may extract the entire objects included in the image. For example, the selecting module 330 may extract the entire objects including text by using optical character recognition (OCR) from the obtained image. Further, the selecting module 330 may also extract the entire objects including an image including the text.

Further, the selecting module 330 may select one or more objects corresponding to the POI information from the entire extracted objects. For example, the selecting module 330 may compare the text included in each of the entire extracted objects with the POI information or the images including the texts included in the entire objects with the POI information. The selecting module 330 may select one or more objects corresponding to the POI information from the entire extracted objects based on the result of the comparison.

In various embodiments, the identifying module 320 may compare the map data included in the information about the region and the location information about the one or more objects. For example, the identifying module 320 may compare the locations of the respective one or more objects and a location relation between the one or more objects.

Accordingly, the identifying module 320 may identify the location of the electronic apparatus 101 based on a result of the comparison. For example, the identifying module 320 may identify a point at which the map data is matched with the location information about the one or more objects as the location of the electronic apparatus 101.

In various embodiments, the identifying module 320 may identify a direction of the electronic apparatus 101 based on the result of the comparison. For example, the identifying module 320 may identify distance information and angle information between each of the one or more objects and the electronic apparatus 101 photographing the image by using the location information about the one or more objects. The identifying module 320 may identify a direction of the electronic apparatus 101 at the identified location of the electronic apparatus 101 by using the identified distance information and angle information.

In various embodiments, the display module 340 may display the location and the direction of the electronic apparatus 101 identified through the identifying module 320 on the display, for example, the display 160, of the electronic apparatus 101. The display module 340 may display a map corresponding to the region, in which it is identified that the electronic apparatus 101 is located, on the display. Further, the display module 340 may display the identified location and direction of the electronic apparatus 101 on the map displayed on the display.

FIG. 4 is a block diagram illustrating a location identifying module of an electronic apparatus according to various embodiments of the present disclosure.

Referring to FIG. 4, the location identifying module 180, according to various embodiments, may include at least some or all of an obtaining module 410, a communication module 420, and a display module 430. The location identifying module 180 may be separately provided from the processor, for example, the processor 120, or the entirety of a part of the location identifying module 180 may be integrated to the processor.

The obtaining module 410, according to various embodiments, may obtain an image through the image sensor, for example, the camera, of the electronic apparatus 101. In order to identify a location, the user may photograph a neighboring environment through the image sensor. The image of the neighboring environment may be a single image or a plurality of images. For example, the image may be a panoramic image formed of a plurality of continuous images.

The communication module 420, according to various embodiments, may transmit the image obtained through the image sensor to the server 500. The server 500 may receive the image and identify the location of the electronic apparatus 101.

The communication module 420, according to various embodiments, may receive the location of the electronic apparatus 101 identified based on the location information on one or more objects selected in the image from the server 500.

As illustrated in FIG. 3, the electronic apparatus 101 may directly identify the location by using the image, or through the server 500 using the image. The method of identifying the location of the electronic apparatus 101 by using the image by the server will be described with reference to FIG. 5 below.

The display module 430, according to various embodiments, may display the location of the electronic apparatus 101 received through the communication module 420. The display module 430 may display a map corresponding to the region, in which it is identified that the electronic apparatus 101 is located, on the display, and display the location of the electronic apparatus 101 on the map.

Further, the server 500 may identify the direction of the electronic apparatus 101 by using the image. The communication module 420 may receive the direction of the electronic apparatus 101 from the 500, and the display module 430 may display the direction of the electronic apparatus 101 on the display.

FIG. 5 is a block diagram illustrating a server according to various embodiments of the present disclosure.

Referring to FIG. 5, the server 500, according to various embodiments, may include a communication module 510 and a processor 520.

The communication module 510, according to various embodiments may receive an image from the electronic apparatus 101. The image may be an image about a neighboring environment obtained through the image sensor of the electronic apparatus 101. The image may be a single image or a plurality of images.

The processor 520, according to various embodiments, may identify location information about one or more objects included in the image. The processor 520 may identify location information about the one or more objects based on the location of each of the one or more objects on the image and an intrinsic parameter of the image sensor of the electronic apparatus 101. The processor 520 may obtain information about the intrinsic parameter of the image sensor through the communication module 510.

The processor 520, according to various embodiments, may identify the location of the electronic apparatus 101 by using the information about the region in which the electronic apparatus 101 is located and the location information about the one or more objects. For example, the processor 520 may compare the information about the region and the location information about the one or more objects. The processor 520 may identify the location of the electronic apparatus 101 based on a result of the comparison.

According to various embodiments, the server 500 may store information about each region in the storage unit (not shown). The information about the region may include at least one of map data corresponding to the region and POI information included in the map data. When the image is received from the electronic apparatus 101 through the communication module 510, the processor 520 may read the information about the region in which the electronic apparatus 101 is located from the storage unit. When the information about the region is not stored in the storage unit, the processor 520 may request the information about the region from another server, which stores the information about the region.

The processor 520, according to various embodiments, may extract the entire objects included in the image. For example, the processor 520 may extract the entire objects including text from the image by using OCR. Further, the processor 520 may also extract the entire objects with an image including the text.

The processor 520, according to various embodiments, may select one or more objects corresponding to the POI information from the extracted objects. The processor 520 may compare the text included in each of the extracted entire objects or the image including the text with the POI information. The processor 520 may select one or more objects corresponding to the POI information from the extracted entire objects based on the result of the comparison.

The processor 520, according to various embodiments, may compare the map included in the information about the region and the location information about the one or more objects. The processor 520 may identify the location of the electronic apparatus 101 based on a result of the comparison. Further, the processor 520 may also identify the direction of the electronic apparatus 101 based on the result of the comparison. The method of identifying the location and the direction of the electronic apparatus 101 by the processor 520 may be similarly performed to the method of identifying the location and the direction of the electronic apparatus 101 aforementioned with reference to FIG. 3.

The communication module 510, according to various embodiments, may transmit the identified location and direction of the electronic apparatus 101 to the electronic apparatus 101. The server 500 may identify the location and the direction of the electronic apparatus 101 by using the image received from the electronic apparatus 101, and transmit the identified location and direction of the electronic apparatus 101 to the electronic apparatus 101.

Figure 6:
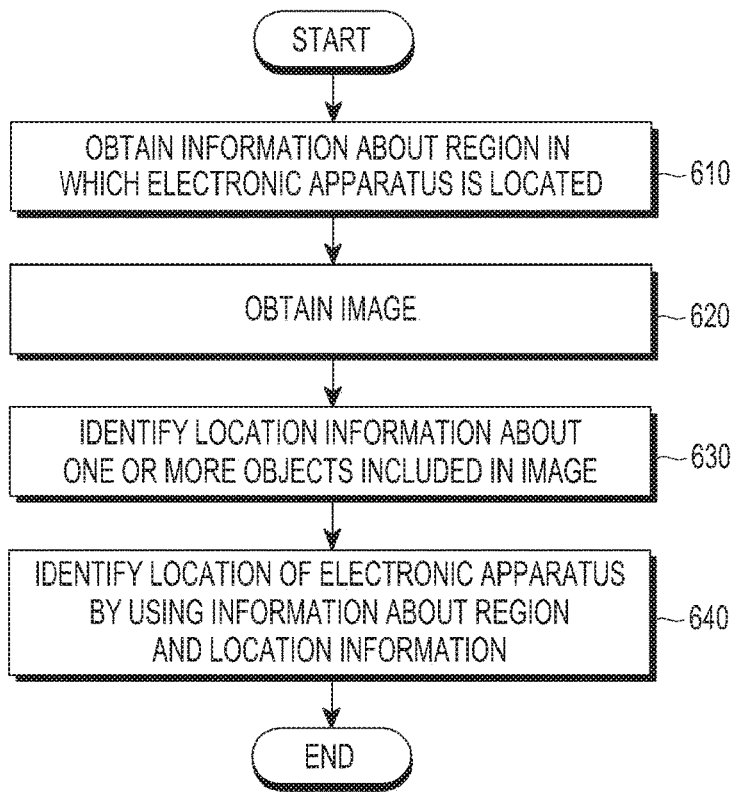
FIG. 6 is a flowchart illustrating a method of identifying a location of an electronic apparatus according to various embodiments of the present disclosure.

FIG. 6 is a flowchart illustrating a method of identifying a location of an electronic apparatus according to various embodiments of the present disclosure.

In operation 610, the electronic apparatus 101 may obtain information about a region in which the electronic apparatus 101 is located. The electronic apparatus 101 may identify a region, in which the electronic apparatus 101 is located, based on one or more signals transmitted and/or received with a base station for communication. For example, a method of identifying, by the electronic apparatus 101, the region by using the signal transmitted and/or received with the base station may include at least one of an angle of arrival (AOA) method, a time of arrival (TOA) method, and a time difference of arrival (TDOA) method. Further, the electronic apparatus 101 may identify the region, in which the electronic apparatus 101 is located, by using a Wi-Fi positioning system (WPS) method. The region may be a region indicating an approximate radius range, in which the electronic apparatus 101 is located, such as a region corresponding to a predetermined administrative district or a region converted and/or covered by the base station.

The electronic apparatus 101 may obtain information about the identified region from the server 500. Further, when the information about the identified region is stored in the memory 130 of the electronic apparatus 101, the electronic apparatus 101 may obtain the information about the region from the memory 130.

In operation 620, the electronic apparatus 101 may obtain an image through the image sensor. In order to identify the location, the user may photograph a neighboring environment through the image sensor in real time. The image may be a single image or a panoramic image formed of a plurality of images for the neighboring environment. The electronic apparatus 101 may obtain an image of a neighboring environment through the image sensor according to execution of an application for identifying location information by using the image.

In operation 630, the electronic apparatus 101 may identify location information about one or more objects included in the image. The electronic apparatus 101 may identify location information about one or more objects based on a location of each of the one or more objects on the image and an intrinsic parameter of the image sensor. The location information about the one or more objects may include at least one of a location of each of the one or more objects and a location relation between the one or more objects. A method of identifying the location information about the one or more objects by the electronic apparatus 101 will be described in detail below.

In operation 640, the electronic apparatus 101 may identify the location of the electronic apparatus 101 by using the information about the region and the location information. For example, the electronic apparatus 101 may compare the information about the region and the location information about the one or more objects, and identify the location of the electronic apparatus 101 based on a result of the comparison. A method of identifying the location of the electronic apparatus 101 will be described in detail below.

Figure 7:
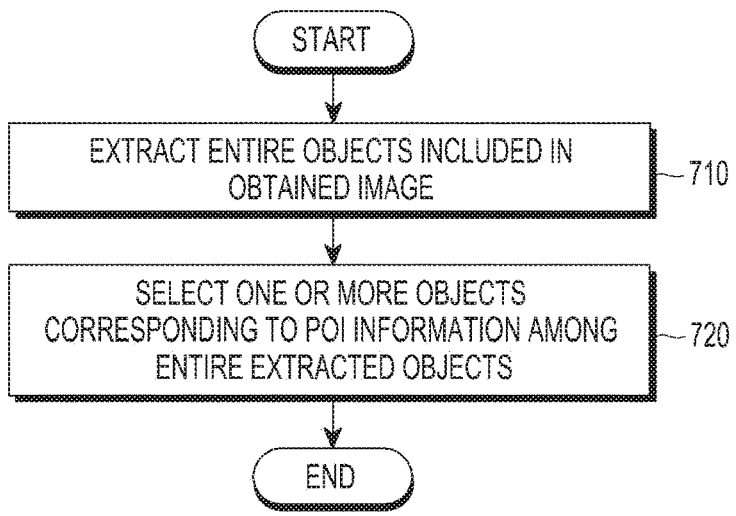
FIG. 7 is a flowchart illustrating a method of selecting at least one object in an obtained image according to various embodiments of the present disclosure.

FIG. 7 is a flowchart illustrating a method of selecting at least one object in an obtained image according to various embodiments of the present disclosure.

In operation 710, the electronic apparatus 101 may extract the entire objects, or in other words all objects, included in the image obtained through the image sensor. In order to identify the location of the electronic apparatus 101, the electronic apparatus 101 may extract one or more objects including information which may correspond to the information about the region. For example, the information, which may correspond to the information about the region, may include name information and image information about a main facility, a terminal, a building, a store, and the like included in the POI information.

The electronic apparatus 101 may extract the entire objects, including text, from the image. Further, the electronic apparatus 101 may also extract the entire objects, including an image including the text. For example, the electronic apparatus 101 may use OCR so as to extract the objects including text from the image.

In operation 720, the electronic apparatus 101 may select one or more objects corresponding to the POI information from the entire extracted objects. For example, the electronic apparatus 101 may compare the text included in each of the entire extracted objects with the POI information or the images including the text included in the entire objects with the POI information. Based on a result of the comparison, the electronic apparatus 101 may select one or more objects corresponding to the POI information about the region in which the electronic apparatus 101 is located.

Figure 8:
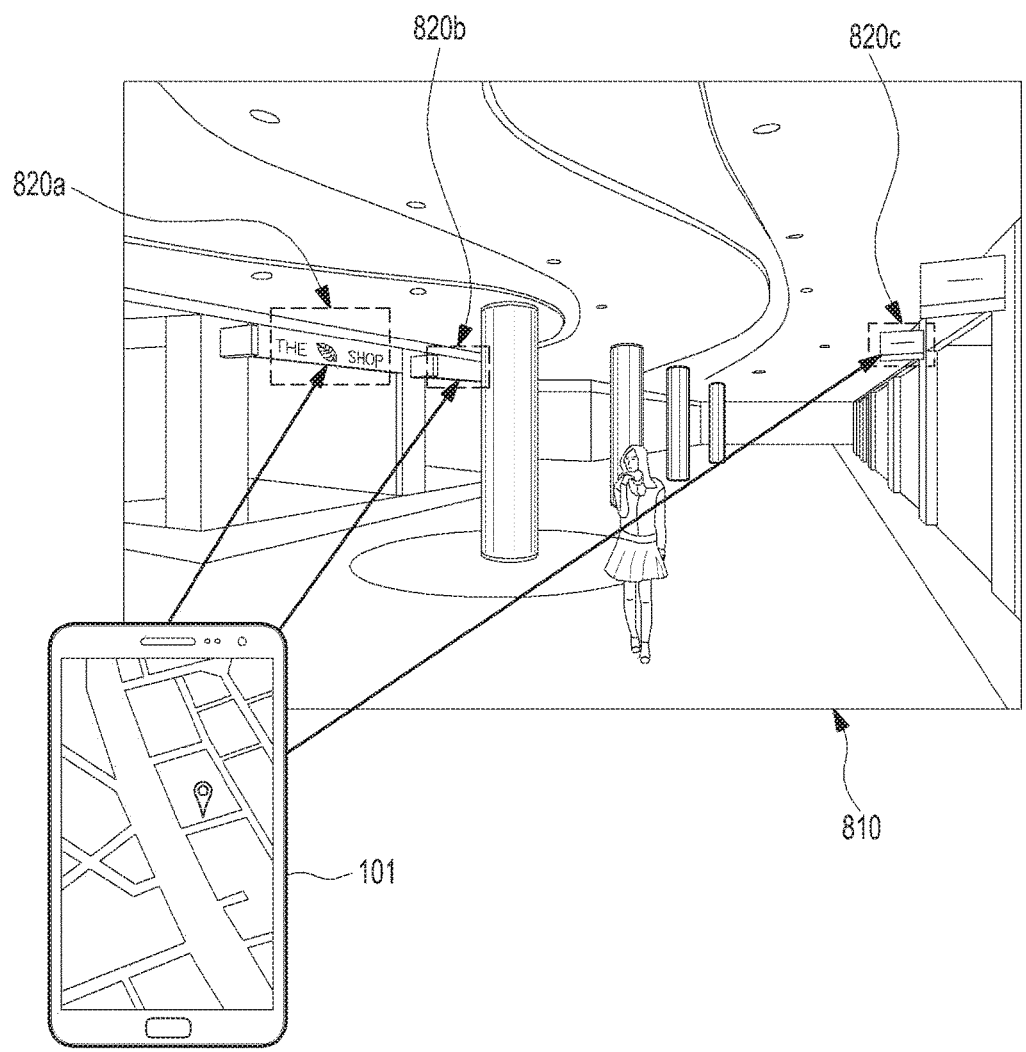
FIG. 8 is a diagram illustrating an example of an image obtained by a camera according to various embodiments of the present disclosure.

FIG. 8 is a diagram illustrating an example of an image obtained by a camera according to various embodiments of the present disclosure.

Referring to FIG. 8, when a user of the electronic apparatus 101 is located in a building, it is difficult to identify a location of the electronic apparatus 101 by using the GPS in the building. Further, when the devices using ZIGBEE, WiFi, and RFID are not installed in a building, it may be difficult to identify a location of the electronic apparatus 101 in the building.

According to various embodiments, in order to identify a location, the user may use an image obtained through the image sensor of the electronic apparatus 101. The user may photograph a neighboring environment of a point, at which the user is current located, through the image sensor of the electronic apparatus 101. For example, when the image sensor of the electronic apparatus 101 faces a predetermined direction, for example, a direction in which the user moves, a neighboring environment existing in the corresponding direction may be obtained as an image through the image sensor.

FIG. 8 illustrates an image 810 of a neighboring environment photographed by the electronic apparatus 101 is a single image, but the image 810 of the neighboring environment may also be a panoramic image formed of a plurality of images according to an embodiment of the present disclosure.

The electronic apparatus 101 may extract the entire objects 810*a*, 820*b*, and 820*c* included in the obtained image 810 of the neighboring environment. The entire objects 810*a*, 820*b*, and 820*c* may include a business name of each store, and the business name may correspond to name information included in the POI information about the region in which the electronic apparatus 101 is located.

The electronic apparatus 101 may select one or more objects corresponding to the POI information among the entire objects 810*a*, 820*b*, and 820*c*. The POI information may represent location information about a main facility, a station, an airport, a terminal, a building, a store, and the like, included in map data corresponding to each region, and the POI information may be used for identifying the location of the electronic apparatus 101. Accordingly, the electronic apparatus 101 may identify location information about only selected one or more objects, which correspond to the POI information, among the entire objects 810*a*, 820*b*, and 820*c*, and may not identify the location information about all of the entire objects 810*a*, 820*b*, and 820*c* in such a case.

For example, when the first object 820*a* and the second object 820*b* correspond to the POI information, the electronic apparatus 101 may select the first object 820*a* and the second object 820*b* from the entire objects 810*a*, 820*b*, and 820*c*. Further, the electronic apparatus 101 may identify the location information about only the first object 820*a* and the second object 820*b*.

Figure 9A:
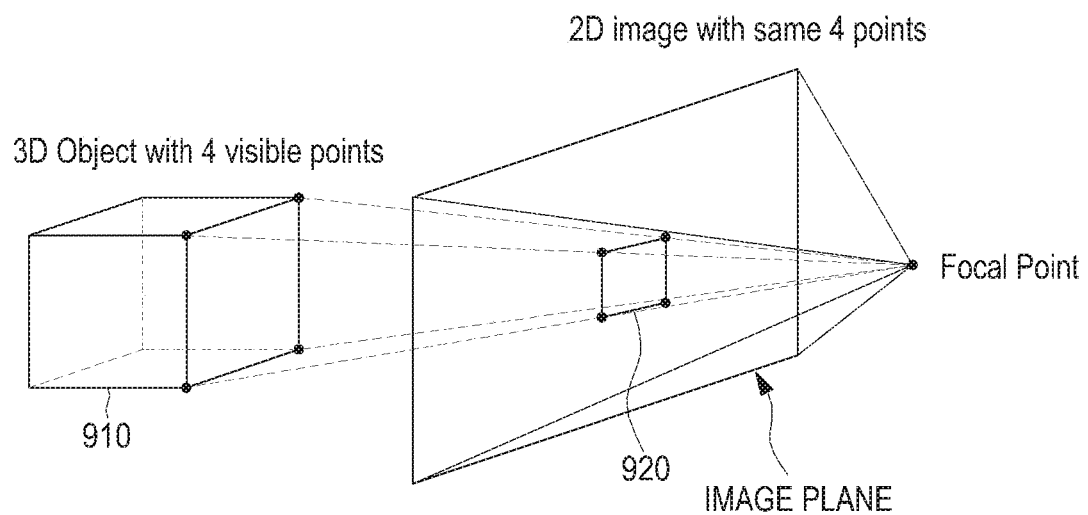
FIGS. 9A, 9B, and 9C are diagrams for describing a method of identifying a location of one or more objects according to various embodiments of the present disclosure.
Figure 9B:
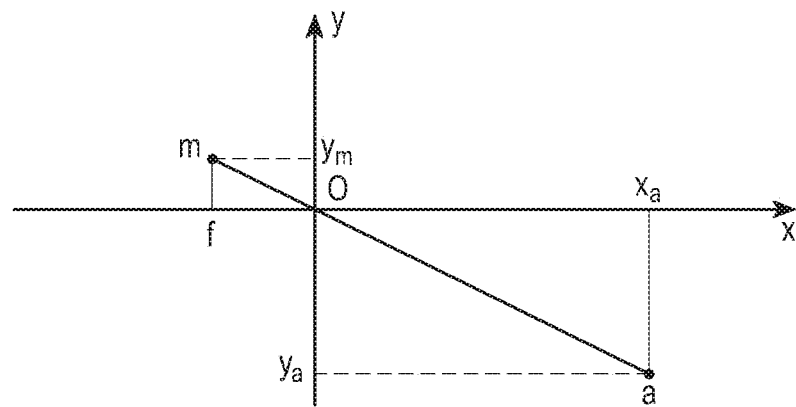
Figure 9C:
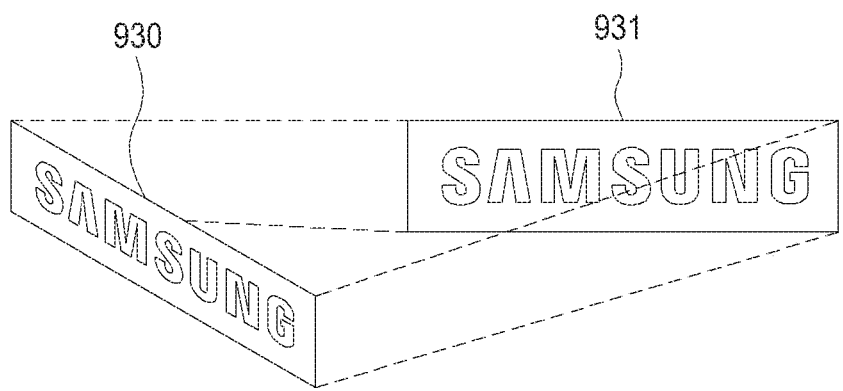

FIGS. 9A, 9B, and 9C are diagrams for describing a method of identifying a location of one or more objects according to various embodiments of the present disclosure.

Referring to FIG. 9, in various embodiments, the electronic apparatus 101 may identify location information about the selected one or more objects. The location information may include at least one of a location of each of the one or more objects and a location relation between the one or more objects. FIGS. 9A, 9B, and 9C describe a method of identifying the location of the one or more objects by using a pinhole method.

A relationship between a 3D object 910, a 2D object 920 in which the 3D object 910 may be displayed on an image plane, and a focal point of the image sensor may be illustrated as FIG. 9A.

The relationship between the 3D object 910, the 2D object 920, and the focal point may be represented by a graph illustrated in FIG. 9B. The graph may represent a relationship between the 3D object 910 and the 2D object 920 corresponding to the 3D object 910 based on the focal point as the origin. In the graph, an x-axis may represent a distance between the focal point and each object, and a y-axis may represent a size of the 3D object 910 and the second object 920.

The relationship between the 3D object 910 and the 2D object 920 represented in the graph may be represented by Equation 1.

$$y_m = -\frac{fy_a}{X_a} \qquad \text{Equation 1}$$

Here, f may represent a focal length that is a distance between the image plane and the focal point, and $X_a$ may represent a distance between the 3D object 910 and the focal point. Further, $y_m$ may represent a size of the 2D object 920, and $y_a$ may represent a size of the 3D object 910.

The focal length f is one of the intrinsic parameters of the image sensor and a previously obtained value, and the distance $y_m$ between the 2D object 920 and the focal point may be obtained based on the obtained image.

In the various embodiments of the present disclosure, the electronic apparatus 101 may obtain an image photographing a plurality of 3D objects, and the obtained image may include a plurality of 2D objects corresponding to the plurality of 3D objects, respectively. The electronic apparatus 101 may recognize a location of each of the 2D objects in the 2D image. The electronic apparatus 101 may identify a location of the 3D object by using a previously obtained focal length F and a location and a size of each 2D object. More particularly, the electronic apparatus 101 may identify the distance between the electronic apparatus 101 and the 3D object, and identify the location of the 3D object by using the identified distance to the 3D object.

Further, as illustrated in FIG. 9C, a form 930 on the photographed image may be differently distorted from an actual form 931 according to information about a distance, a direction, or an angle at which the user takes a photograph by using the image sensor. In this case, the direction of the electronic apparatus 101 may be identified by considering the intrinsic parameter of the image sensor and a distortion degree at which the form 930 on the photographed image is distorted compared to the actual form 931.

Figure 10A:
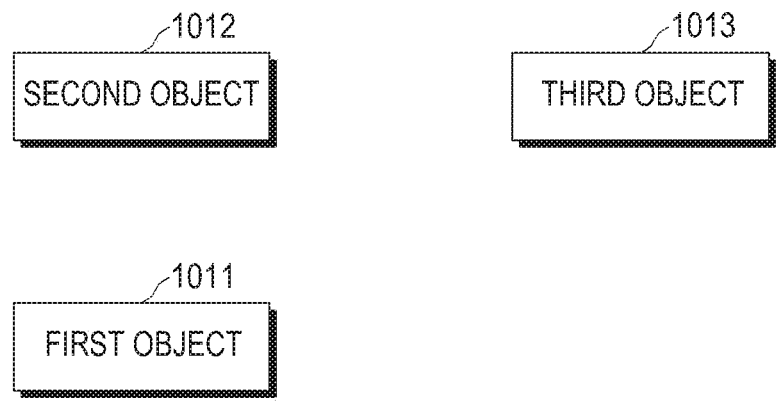
FIGS. 10A and 10B are diagrams for describing a method of identifying a location relation between one or more objects according to various embodiments of the present disclosure.
Figure 10B:
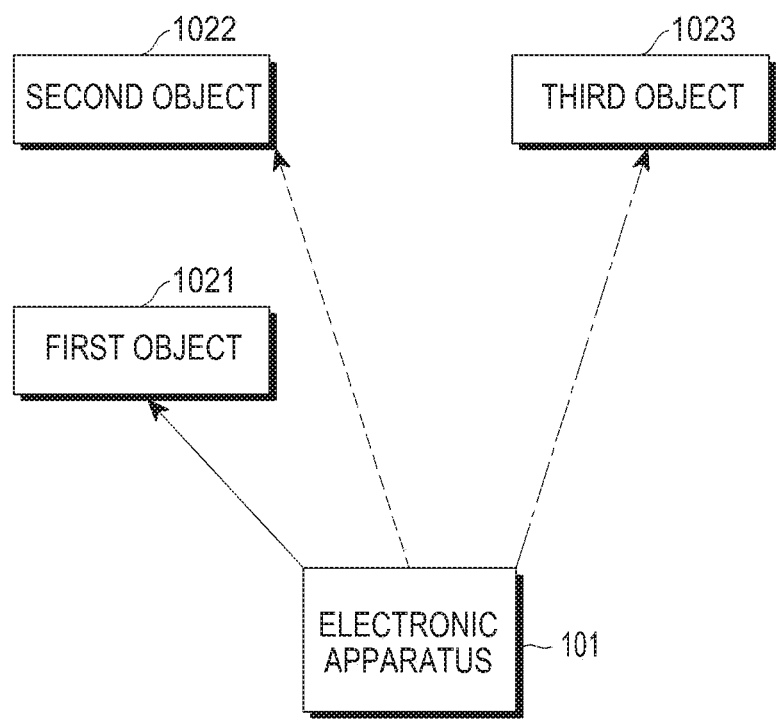

FIGS. 10A and 10B are diagrams for describing a method of identifying a location relation between one or more objects according to various embodiments of the present disclosure.

Referring to FIG. 10A, a location relationship between a first object 1011, a second object 1012, and a third object 1013 of which locations are identified are illustrated. As described with reference to FIGS. 9A to 9C, the locations of the first object 1011, the second object 1012, and the third object 1013 may be identified. In this case, the location relations between the first object 1011, the second object 1012, and the third object 1013 may be identified based on the identified locations of the first object 1011, the second object 1012, and the third object 1013.

For example, when it is identified that the first object 1011 is closer to the electronic apparatus 101 than the second object 1012 and the third object 1013, and the third object 1013 is located at a right side of the first object 1011 and the second object 1012, the location relationships between the first object 1011, the second object 1012, and the third object 1013 may be identified. Further, based on the location of each of the first object 1011, the second object 1012, and the third object 1013, the location relationships between such may include information on a distance between the respective objects. For example, information indicating that the first object 1011 and the second object 1012 are spaced apart from each other by a distance x in a first direction may be contained in the location relation between the first object 1011 and the second object 1012.

Referring to FIG. 10B, the location relationships between objects may further include information on the location of the electronic apparatus 101 and a distance, a direction, or an angle between respective ones of a first object 1021, a second object 1022, and a third object 1023. Based on the information on the distance, the direction, or the angle, it is possible to determine a distortion degree at which the first object 1021, the second object 1022, and the third object 1023 are distorted compared to the actual forms. The electronic apparatus 101 may identify a direction of the electronic apparatus 101 based on the determined distortion degree of each of the first object 1021, the second object 1022, and the third object 1023.

Figure 11:
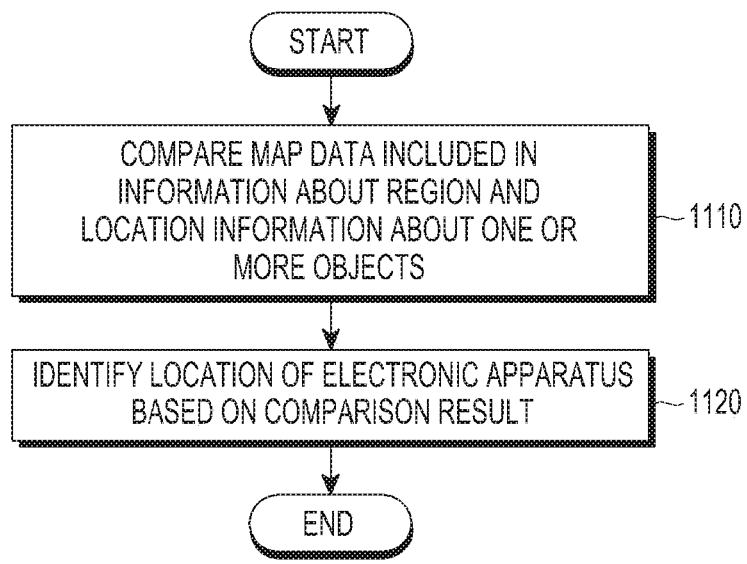
FIG. 11 is a flowchart illustrating a method of identifying a location of an electronic apparatus according to various embodiments of the present disclosure.

FIG. 11 is a flowchart illustrating a method of identifying a location of an electronic apparatus according to various embodiments of the present disclosure.

In operation 1110, the electronic apparatus 101 may compare map data including information about a region in which the electronic apparatus 101 is located and location information about one or more objects. For example, the electronic apparatus 101 may compare POI information corresponding to each of the one or more objects in the map data and the location of each of the one or more objects, and the location relationship between the one or more objects.

Through the comparison, the electronic apparatus 101 may identify a point at which the location of each of the one or more objects in the map data is matched to the location relationship between the one or more objects.

In operation 1120, the electronic apparatus 101 may identify the location of the electronic apparatus 101 based on a result of the comparison. For example, the electronic apparatus 101 may identify the matched point as the location of the electronic apparatus 101.

Further, the electronic apparatus 101 may also identify the direction of the electronic apparatus 101 based on a result of the comparison. As described above, the electronic apparatus 101 may also identify the direction of the electronic apparatus 101 considering the distortion degree at which the form of each object is distorted compared to the actual form. Further, the electronic apparatus 101 may also identify the direction of the electronic apparatus 101 considering each of the location relationships between the one or more objects and a relative relationship with the location of the electronic apparatus 101.

The electronic apparatus 101 may display the identified location and direction of the electronic apparatus 101 on the display of the electronic apparatus 101. The electronic apparatus 101 may display a map corresponding to the region on the display, and display the identified location and direction of the electronic apparatus 101 on the map.

FIGS. 12A to 12D are flowcharts illustrating a method of identifying a location of the electronic apparatus according to various embodiments of the present disclosure.

Figure 12A:
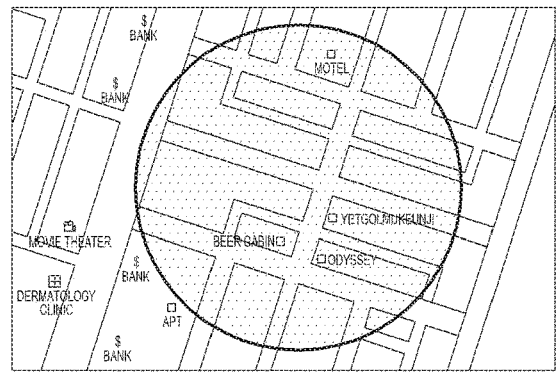
FIGS. 12A, 12B, 12C, and 12D illustrate a method of identifying a location of an electronic apparatus according to various embodiments of the present disclosure.

Referring to FIG. 12A, the electronic apparatus 101 may identify a region, in which the electronic apparatus 101 is located, based on one or more signals transmitted and/or received with the base station. For example, the region in which the electronic apparatus 101 is located may be identified by an AOA method using a difference in a signal reception angle in three base stations receiving a signal of the electronic apparatus 101. Further, the region in which the electronic apparatus 101 is located may be identified by a TOA method using a difference in a signal arrival time between one service base station and two neighboring base stations receiving the signal of the electronic apparatus 101. Further, the region in which the electronic apparatus 101 is located may also be identified by a time and direction of arrival (TDOA) method of measuring signal delays of adjacent base stations based on a signal of a service base station, generating a plurality of hyperbolas based on a value obtained by measuring a difference in a signal arrival time between the signal of the service base station and signals of the adjacent base stations, and using a cross point of the hyperbolas.

The electronic apparatus 101 may obtain information about the identified region. The information about the region may contain map data corresponding to the region and POI information included in the map data.

Figure 12B:
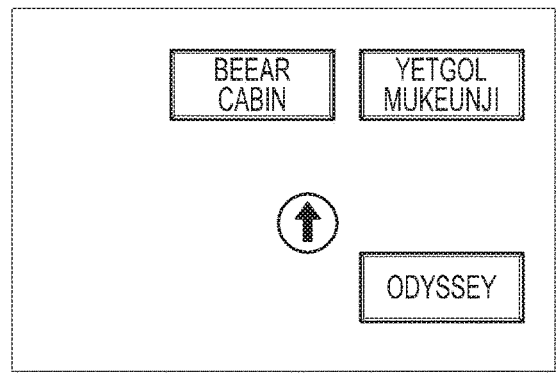

Referring to FIG. 12B, the electronic apparatus 101 may identify location information about one or more objects included in the obtained image. The location information about the one or more objects may include a location of each of the one or more objects and a location relation between the one or more objects. The identified location information about the one or more objects may be illustrated as FIG. 12B.

Figure 12C:
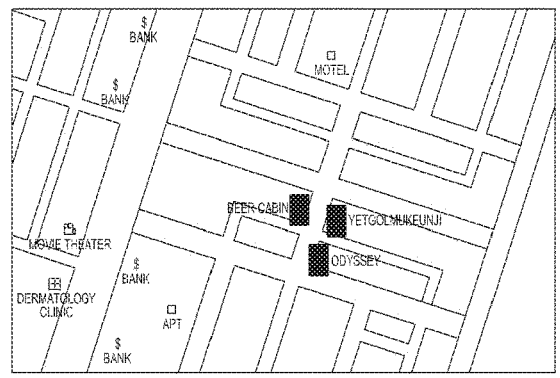

Referring to FIG. 12C, the electronic apparatus 101 may compare the map data corresponding to the region and the location information about the one or more objects. For example, through the comparison, the electronic apparatus 101 may identify a point at which the map data is matched to the location information about the one or more objects.

Figure 12D:
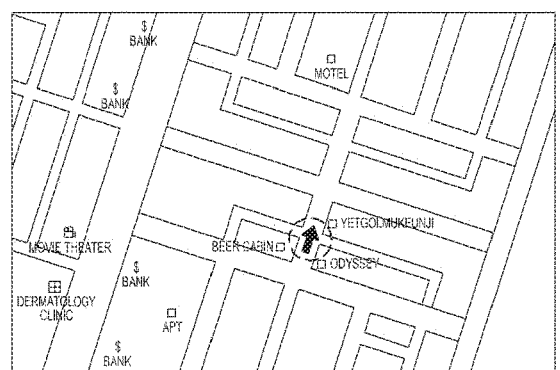

Referring to FIG. 12D, the electronic apparatus 101 may identify the location of the electronic apparatus 101 by using the matched point. For example, the electronic apparatus 101 may identify the location of the electronic apparatus 101 by considering each of the one or more objects and the location of the electronic apparatus 101 at the matched point.

Further, the electronic apparatus 101 may identify distance information and angle information between each of the one or more objects and the electronic apparatus 101 by using the location information about one or more objects. The electronic apparatus 101 may identify a direction of the electronic apparatus 101 at the identified location of the electronic apparatus 101 by using the identified distance information and angle information.

The identified location and direction of the electronic apparatus 101 may be displayed on the display of the electronic apparatus 101. The electronic apparatus 101 may display a map corresponding to the region on the display, and display the location and the direction of the electronic apparatus 101 on the map.

Figure 13:
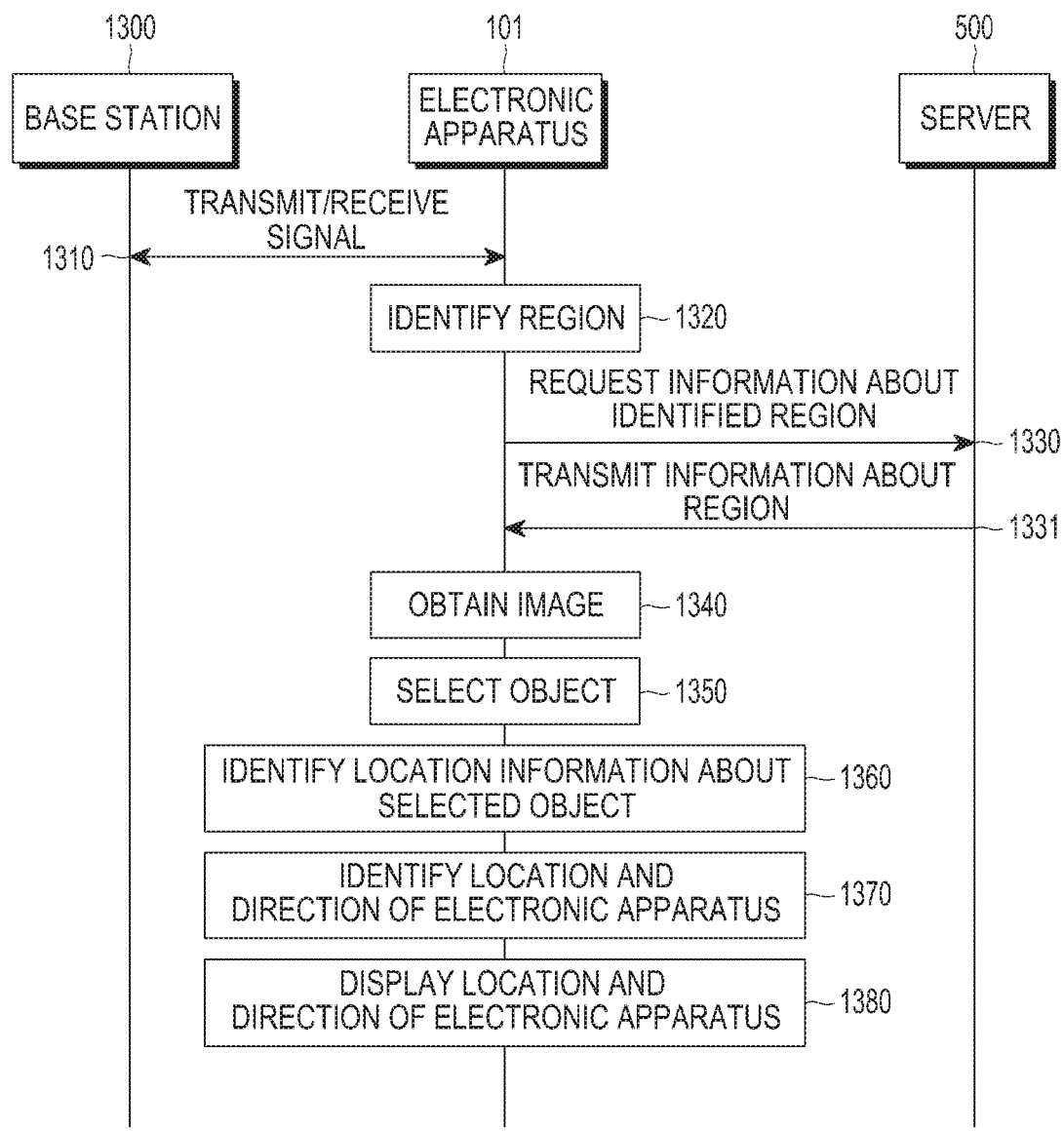
FIG. 13 illustrates a general flow for describing a method of identifying a location of an electronic apparatus according to various embodiments of the present disclosure.

FIG. 13 illustrates a general flow for describing a method of identifying a location of the electronic apparatus according to various embodiments of the present disclosure.

Referring to FIG. 13, a general flow between the electronic apparatus 101, the server 500, and a base station 1300 for describing a method of identifying a location of the electronic apparatus are illustrated.

In operation 1310, the electronic apparatus 101 may transmit and/or receive a signal with the base station 1300 through a communication means. In operation 1320, the electronic apparatus 101 may identify a region, in which the electronic apparatus 101 is located, by using a signal transmitted and/or received with the base station 1300, or an approximate radius range in which the electronic apparatus 101 is located.

In operation 1330, the electronic apparatus 101 may request information about the identified region from the server 500. The information about the region may contain at least one of map data corresponding to the region and POI information included in the map data.

In operation 1331, the server 500 may transmit the information about the identified region to the electronic apparatus 101. However, when the information about the identified region is stored in the memory 130 of the electronic apparatus 101, the electronic apparatus 101 may obtain the information about the identified region from the memory 130. In this case, the electronic apparatus 101 may not perform operation 1330 and operation 1331 of requesting and receiving the information about the region from the server 500.

In operation 1340, the electronic apparatus 101 may obtain an image through the image sensor of the electronic apparatus 101. The image may be used for identifying the location of the electronic apparatus 101. The image may be a single image or a panoramic image formed of a plurality of images for the neighboring environment.

In operation 1350, the electronic apparatus 101 may select the one or more objects from the entire objects extracted from the image based on the information about the region. For example, the electronic apparatus 101 may select one or more objects corresponding to the POI information included in the information about the region from the entire extracted objects.

In operation 1360, the electronic apparatus 101 may identify location information about one or more selected objects. The electronic apparatus 101 may identify location information about one or more selected objects based on a location of each of the one or more selected objects on the image and an intrinsic parameter of the image sensor. The location information about the one or more selected objects may include at least one of a location of each of the one or more selected objects and a location relationship between the one or more selected objects.

In operation 1370, the electronic apparatus 101 may identify a location and a direction of the electronic apparatus 101 by using the information about the region and the location information about the one or more selected objects. For example, the electronic apparatus 101 may compare the information about the region and the location information about the one or more selected objects. The electronic apparatus 101 may identify the location and the direction of the electronic apparatus 101 based on a result of the comparison.

In operation 1370, the process of identifying, by the electronic apparatus 101, the location and the direction of the electronic apparatus 101 may be performed by the server 500. For example, the electronic apparatus 101 may identify the location information about the one or more selected objects, and transmit the identified location information about the one or more selected objects to the server 500. The server 500 may identify the location and the direction of the electronic apparatus 101 by using the received location information about the one or more selected objects, and transmit the location and the direction of the electronic apparatus 101 to the electronic apparatus 101.

In operation 1380, the electronic apparatus 101 may display the identified location and direction of the electronic apparatus 101 on the display of the electronic apparatus 101. The electronic apparatus 101 may display a map corresponding to the region on the display, and display the location and the direction of the electronic apparatus 101 on the map.

Figure 14:
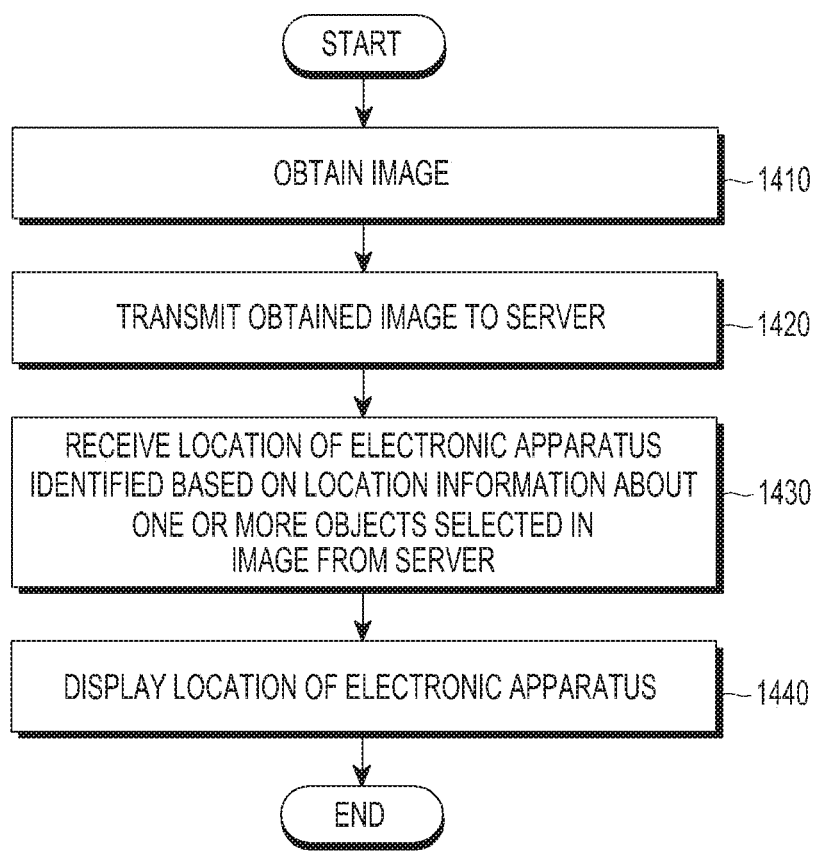
FIG. 14 is a flowchart illustrating a method of identifying a location of an electronic apparatus according to various embodiments of the present disclosure.

FIG. 14 is a flowchart illustrating a method of identifying a location of an electronic apparatus according to various embodiments of the present disclosure.

Referring to FIG. 14, in operation 1410, the electronic apparatus 101 may obtain an image through the image sensor. The image may be used for identifying the location of the electronic apparatus 101. The image may be a single image or a panoramic image formed of a plurality of images for the neighboring environment.

In operation 1420, the electronic apparatus 101 may transmit the obtained image to the server 500. The server 500 may receive the image and identify a location of the electronic apparatus 101.

In operation 1430, the electronic apparatus 101 may receive the location of the electronic apparatus 101, which may be identified based on location information about one or more objects selected in the image, from the server 500. The electronic apparatus 101 may directly identify the location of the electronic apparatus 101 by using the image, but in order to simplify the process performed by the electronic apparatus 101, the electronic apparatus 101 may identify the location of the electronic apparatus 101 through the server 500.

In operation 1440, the electronic apparatus 101 may display the location of the electronic apparatus 101 on the display. Further, the electronic apparatus 101 may further receive a direction of the electronic apparatus 101 from the server 500. In this case, the electronic apparatus 101 may also display the direction of the electronic apparatus 101 on the display.

Figure 15:
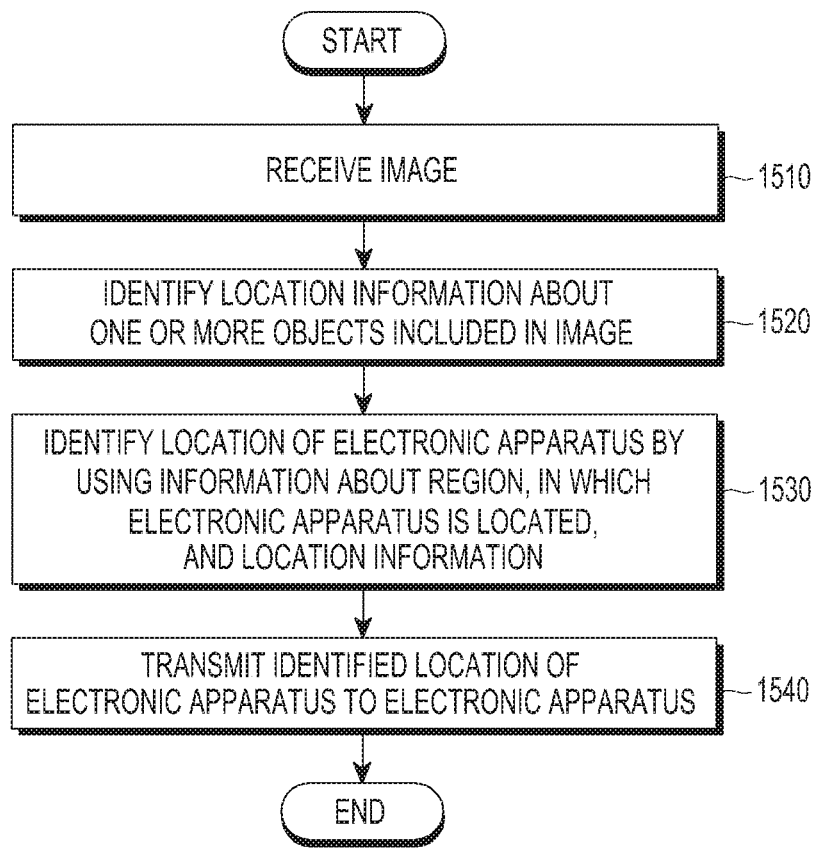
FIG. 15 is a flowchart illustrating an operating method of a server for identifying a location of an electronic apparatus according to various embodiments of the present disclosure.

FIG. 15 is a flowchart illustrating an operating method of a server for identifying a location of an electronic apparatus according to various embodiments of the present disclosure.

In operation 1510, the server 500 may receive an image from the electronic apparatus 101. The image may be an image of a neighboring environment obtained through the image sensor of the electronic apparatus 101 in order to identify a location of the electronic apparatus 101.

In operation 1520, the 500 may identify location information about one or more objects included in the image. The server 500 may identify location information about the one or more objects based on a location of each of the one or more objects on the image and an intrinsic parameter of the image sensor of the electronic apparatus 101.

In operation 1530, the server 500 may identify a location of the electronic apparatus 101 by using the information about a region, in which the electronic apparatus 101 is located, and the location information about the one or more objects. Further, the server 500 may identify a direction of the electronic apparatus 101.

The server 500 may store information about each region, and when the image is received from the electronic apparatus 101, the server 500 may read the information about the region in which the electronic apparatus 101 is located. Further, when the information about the region is not stored, the server 500 may request the information about the region from another server (not shown) storing the information about the region.

In operation 1540, the server 500 may transmit the identified location of the electronic apparatus 101 to the electronic apparatus 101. Further, when the server 500 further identifies the direction of the electronic apparatus 101, the server 500 may also transmit the direction of the electronic apparatus 101 to the electronic apparatus 101.

Figure 16:
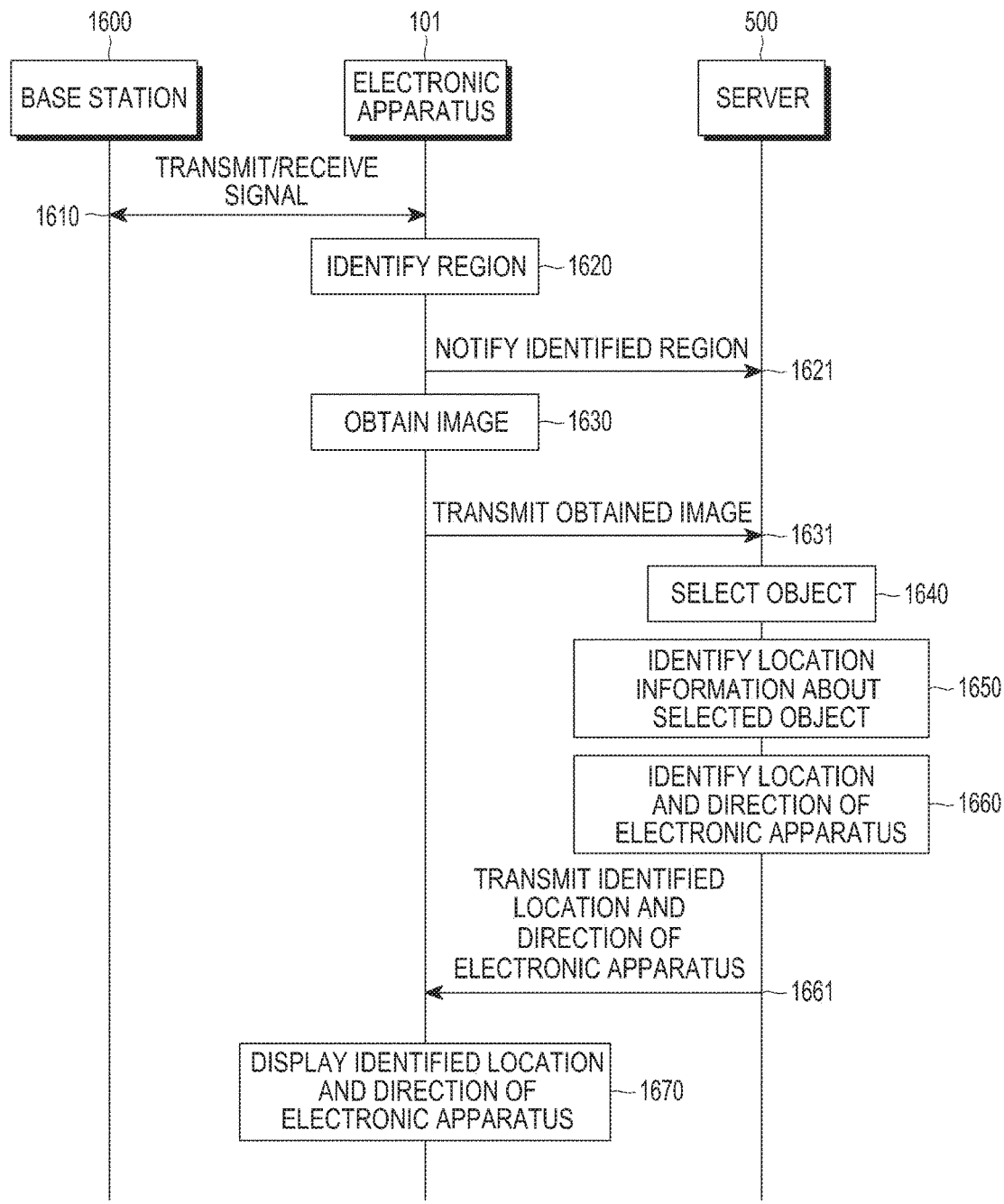
FIG. 16 illustrates a general flow for describing a method of identifying a location of an electronic apparatus according to various embodiments of the present disclosure.

FIG. 16 illustrates a general flow for describing a method of identifying a location of an electronic apparatus according to various embodiments of the present disclosure.

Referring to FIG. 16, in operation 1610, the electronic apparatus 101 may transmit and/or receive a signal with a base station 1600 through a communication means. In operation 1620, the electronic apparatus 101 may identify a region in which the electronic apparatus 101 is located by using a signal transmitted and/or received with the base station 1600, or an approximate radius range in which the electronic apparatus 101 is located. In operation 1621, the electronic apparatus 101 may provide a notification for the identified region to the server 500.

In operation 1630, the electronic apparatus 101 may obtain an image through the image sensor of the electronic apparatus 101. The image may be used for identifying the location of the electronic apparatus 101. The image may be a single image or a panoramic image formed of a plurality of images for the neighboring environment.

In operation 1631, the electronic apparatus 101 may transmit the obtained image to the server 500.

In operation 1640, the server 500 may select the one or more objects from the entire objects extracted from the image based on the information about the region. For example, the electronic apparatus 101 may select one or more objects corresponding to the POI information included in the information about the region from the entire extracted objects.

In operation 1650, the server 500 may identify location information about one or more selected objects. The electronic apparatus 101 may identify location information about one or more selected objects based on a location of each of the one or more selected objects on the image and an intrinsic parameter of the image sensor.

In operation 1660, the electronic apparatus 101 may identify a location and a direction of the electronic apparatus 101 by using the information about the region and the location information about the one or more selected objects. For example, the electronic apparatus 101 may compare the information about the region and the location information about the one or more selected objects. The electronic apparatus 101 may identify the location and the direction of the electronic apparatus 101 based on a result of the comparison.

In operation 1661, the server 500 may transmit the identified location and direction of the electronic apparatus 101 to the electronic apparatus 101.

In operation 1670, the electronic apparatus 101 may display the identified location and direction of the electronic apparatus 101 on the display of the electronic apparatus 101. The electronic apparatus 101 may display a map corresponding to the region on the display, and display the location and the direction of the electronic apparatus 101 on the map.

According to various embodiments of the present disclosure, the method of identifying a location of an electronic apparatus includes obtaining information about a region in which the electronic apparatus is located, obtaining an image through an image sensor included in the electronic apparatus, identifying location information about one or more objects included in the image, and identifying a location of the electronic apparatus by using the information about the region and the location information.

According to various embodiments of the present disclosure, the method of identifying a location of the electronic apparatus may further include identifying the region, in which the electronic apparatus is located, based on one or more signals transmitted and/or received between the electronic apparatus and a base station.

According to various embodiments of the present disclosure, the information about the region may include map data corresponding to the region and POI information included in the map data.

According to various embodiments of the present disclosure, the method of identifying a location of the electronic apparatus may further include selecting the one or more objects from the entire objects extracted in the image based on the information about the region.

According to various embodiments of the present disclosure, the selecting of the one or more objects may include extracting the entire objects included in the image, and selecting the one or more objects corresponding to the POI information from the entire extracted objects.

According to various embodiments of the present disclosure, the location information about the one or more objects may include at least one of a location of each of the one or more objects and a location relationship between the one or more objects.

According to various embodiments of the present disclosure, the method of identifying a location of the electronic apparatus may further include comparing map data included in the information about the region and the location information about the one or more objects, and identifying a location of the electronic apparatus based on a result of the comparison.

According to various embodiments of the present disclosure, the method of identifying a location of the electronic apparatus may further include identifying a direction of the electronic apparatus based on the result of the comparison.

According to various embodiments of the present disclosure, the method of identifying a location of the electronic apparatus may further include displaying the identified location and direction of the electronic apparatus.

According to various embodiments of the present disclosure, the electronic apparatus may include a communication module for obtaining information about a region, in which the electronic apparatus is located, an image sensor for obtaining an image, and a processor for identifying location information about one or more objects included in the image, and a location of the electronic apparatus by using the location information.

According to various embodiments of the present disclosure, the processor may identify a region in which the electronic apparatus is located based on one or more signals transmitted and/or received with a base station through the communication module.

According to various embodiments of the present disclosure, the information about the region may include map data corresponding to the region and POI information included in the map data.

According to various embodiments of the present disclosure, the processor may select the one or more objects from the entire objects extracted from the image based on the information about the region.

According to various embodiments of the present disclosure, the processor may extract the entire objects included in the image, and select the one or more objects corresponding to the POI information from the entire extracted objects.

According to various embodiments of the present disclosure, the location information about the one or more objects may include at least one of a location of each of the one or more objects and a location relation between the one or more objects.

According to various embodiments of the present disclosure, the processor may compare map data included in the information about the region and location information about the one or more objects, and identify a location of the electronic apparatus based on a result of the comparison.

According to various embodiments of the present disclosure, the processor may identify a direction of the electronic apparatus based on the result of the comparison.

According to various embodiments of the present disclosure, the processor may control a display so as to display the identified location and direction of the electronic apparatus.

According to various embodiments of the present disclosure, the method of identifying a location of the electronic apparatus may further include obtaining an image through an image sensor included in the electronic apparatus, transmitting the obtained image to a server, receiving a location of the electronic apparatus identified based on location information about one or more objects selected in the image from the server, and displaying the location of the electronic apparatus.

According to various embodiments of the present disclosure, an operating method of the server for identifying a location of the electronic apparatus may include receiving an image from the electronic apparatus, identifying location information about one or more objects included in the image, identifying a location of the electronic apparatus by using information about a region in which the electronic apparatus is located and the location information, and transmitting the identified location of the electronic apparatus to the electronic apparatus.

Figure 17:
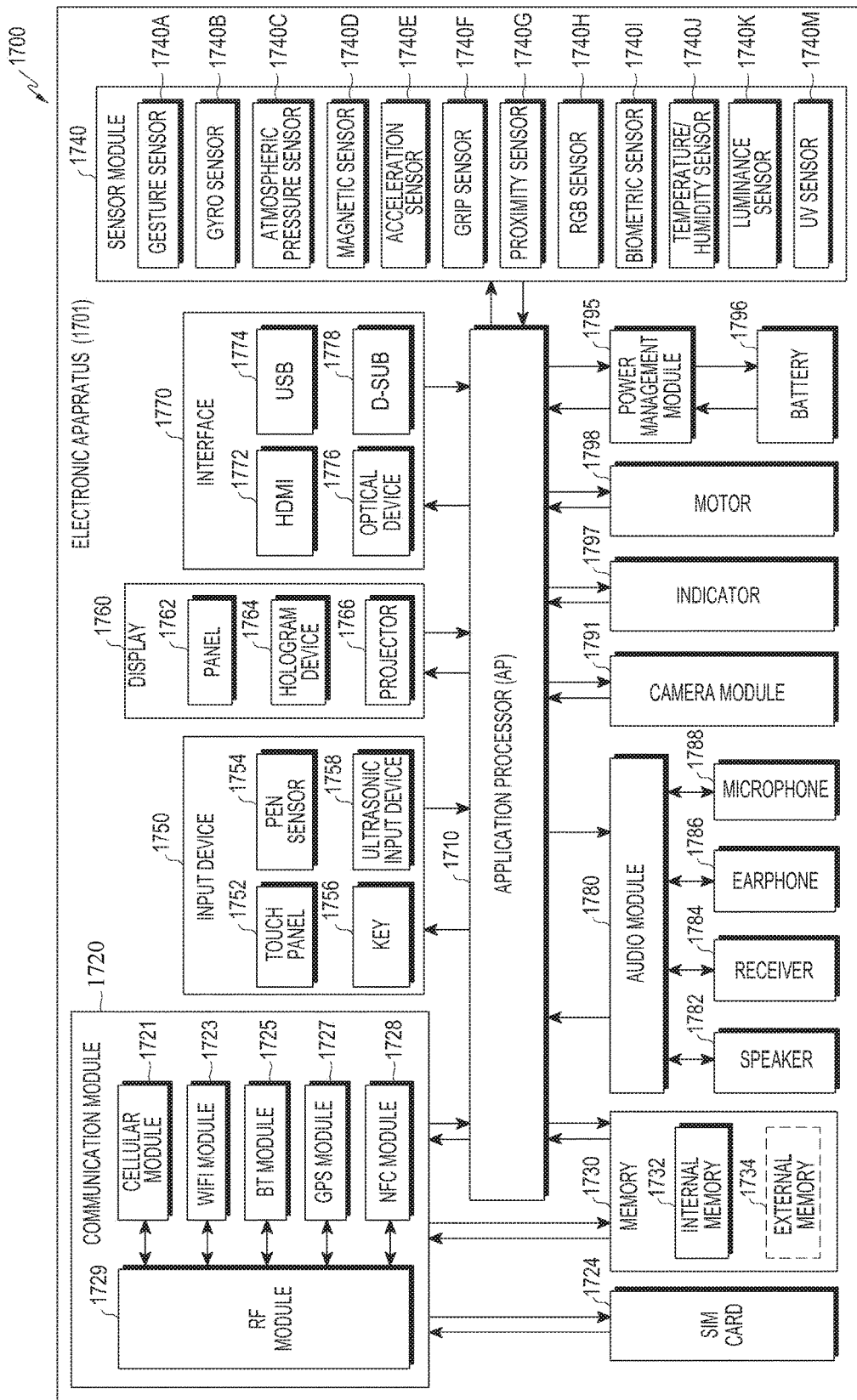
FIG. 17 is a block diagram illustrating an electronic apparatus according to various embodiments of the present disclosure.

FIG. 17 is a block diagram illustrating an electronic apparatus according to various embodiments of the present disclosure.

Referring to FIG. 17, a block diagram 1700 illustrates an electronic apparatus 1701 that may include, for example, all or a part of the electronic apparatus 101 illustrated in FIG. 1. For example, the electronic apparatus 101 illustrated in FIG. 1 may include the entire or a part of the electronic apparatus 1701 illustrated in FIG. 17. The electronic apparatus 1701 may include at least one AP 1710, a communication module 1720, a Subscriber Identification Module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The AP 1710 may control a plurality of hardware or software elements connected to the AP 1710 by driving an operating system or an application program, and perform processing and calculation on various data. The AP 1710 may be embodied as, for example, a system on chip (SoC). According to one embodiment, the AP 1710 may further include a graphic processing unit (GPU) (not shown) and an image signal processor (not shown). The AP 1710 may also include at least some, for example, the cellular module 1721, of the elements illustrated in FIG. 17. The AP 1710 may load a command or data received from at least one of other elements, for example, a nonvolatile memory, to the volatile memory and process the loaded command and data, and store various data in the nonvolatile memory.

The communication module 1720 may have a configuration which is the same as or similar to the communication interface 170 of FIG. 1. The communication module 1720 may include, for example, the cellular module 1721, a WiFi module 1723, a Bluetooth (BT) module 1725, a GPS module 1727, a near field communication (NFC) module 1728, and a radio frequency (RF) module 1729.

The cellular module 1721 may provide, for example, a voice call, a video call, text services, or Internet services through a communication network. According to an embodiment, the cellular module 1721 may perform discrimination and authentication of the electronic apparatus 1701 within the communication network by using a SIM, for example, the SIM card 1724. According to an embodiment, the cellular module 1721 may perform at least some of the functions which may be provided by the AP 1710. According to an embodiment, the cellular module 1721 may include a CP.

Each of the Wi-Fi module 1723, the BT module 1725, the GPS module 1727, and the NFC module 1728 may include, for example, a processor for processing data transmitted and/or received through the corresponding module. According to an embodiment, at least some, for example, two or more, of the cellular module 1721, the WiFi module 1723, the BT module 1725, the GPS module 1727, and the NFC module 1728 may be included in one integrated chip (IC) or an IC package.

The RF module 1729 may transmit and/or receive, for example, a communication signal, for example, an RF signal. The RF module 1729 may include, for example, a transceiver, a power amp module (PAM), a frequency filter, a low noise amplifier (LNA), an antenna, or the like. According to another embodiment, at least one of the cellular module 1721, the WiFi module 1723, the BT module 1725, the GPS module 1727, and the NFC module 1728 may transmit and/or receive the RF signal through a separate RF module.

The SIM card 1724 may include, for example, a card and/or an embedded SIM including a subscriber identification module, and include intrinsic identification information, for example, an integrated circuit card identifier (ICCID), or subscriber information, for example, an international mobile subscriber identity (IMSI).

The memory 1730, for example, the memory 130, may include an internal memory 1732 or an external memory 1734. The internal memory 1732 may include at least one of a volatile memory, for example, a random access memory (RAM), a dynamic RAM (DRAM), a static RAM (SRAM), and a synchronous DRAM (SDRAM)) or a non-volatile memory, for example, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

The external memory 1734 may further include a flash drive, for example, a compact flash (CF), a secure digital (SD), a micro SD (Micro-SD), a Mini-SD, an extreme digital (xD), a memory stick or the like. The external memory 1734 may be functionally and/or physically connected with the electronic apparatus 1701 through various interfaces.

The sensor module 1740 may measure a physical quantity or detect an operation state of the electronic apparatus 1701, and may convert the measured or detected information into an electronic signal. The sensor module 1740 may include, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G a red, green, blue (RGB) sensor 1740H, a biometric sensor 1740I, a temperature/humidity sensor 1740J, an luminance sensor 1740K, and an ultraviolet (UV) sensor 1740M. Additionally or alternatively, the sensor module 1740 may include, although not shown, for example, an E-nose sensor, an electromyography (EMG) sensor, an electroencephalogram (EEG) sensor, an electrocardiogram (ECG) sensor, an infrared red (IR) sensor, an iris sensor, or a fingerprint sensor. The sensor module 1740 may further include a control circuit for controlling one or more sensors included therein. In one embodiment, the electronic apparatus 1701 may further include a processor (not shown) configured to control the sensor module 1740 as a part of or a separate part from the AP 1710, to control the sensor module 1740 when the AP 1710 is in a sleep state.

The input device 1750 may include, for example, a touch panel 1752, a pen sensor 1754, a key 1756, or an ultrasonic input device 1758. The touch panel may adopt at least one method of, for example, a capacitive method, a resistive method, an infrared ray method, and an ultrasonic wave method. Further, the touch panel 1752 may further include a control circuit. The touch panel 1752 may further include a tactile layer to provide a tactile response to a user.

The pen sensor 1754 may be, for example, a part of the touch panel or include a separate sheet for recognition. The key 1756 may include, for example, a physical button, an optical key, or a keypad. The ultrasonic input device 1758 may detect sound waves through a microphone, for example, the microphone 1788, and confirm data in the electronic apparatus 1701 by using an input tool generating an ultrasonic wave signal.

The display 1760, for example, the display 160, may include a panel 1762, a hologram device 1764, and a projector 1766. The panel 1762 may include a configuration which is the same as or similar to the display 160 of FIG. 1. The panel 1762 may be embodied to be, for example, flexible, transparent, or wearable. The panel 1762 may also be configured as one module together with the touch panel 1752. The hologram 1764 may show a stereoscopic image in the air by using interference of light. The projector 1766 may project light onto a screen to display an image. For example, the screen may be located inside or outside the electronic apparatus 1701. According to one embodiment, the display 1760 may further include a control circuit for controlling the panel 1762, the hologram device 1764, or the projector 1766.

The interface 1770 may include, for example, a high-definition multimedia interface (HDMI) 1772, a USB 1774, an optical interface 1776, or a D-subminiature (D-sub) 1778. The interface 1770 may be included in, for example, the communication interface 170 illustrated in FIG. 1. Additionally or alternatively, the interface 1770 may include, for example, a mobile high-definition link (MHL) interface, a SD card/multi-media card (MMC) interface, or an Infrared Data Association (IrDA) standard interface.

The audio module 1780 may bilaterally convert a sound and an electrical signal. At least some elements of the audio module 1780 may be included in, for example, the input/output interface 140 illustrated in FIG. 1. The audio module 1780 may process sound information input or output through, for example, a speaker 1782, a receiver 1784, earphones 1786, the microphone 1788, or the like.

The camera module 1791 is a device capable of photographing, for example, a still image and a video, and according to one embodiment, the camera module 180 may include one or more image sensors, for example, a front sensor or a rear sensor, a lens, an Image Signal Processor, or a flash, for example, an light emitting diode (LED) or a xenon lamp.

The power management module 1795 may manage power of the 1701. According to an embodiment, the power management module 1795 may include, for example, a power management IC (PMIC), a charger IC, or a battery or fuel gauge. The PMIC may have a wired and/or wireless charging method. Examples of the wireless charging method include a magnetic resonance scheme, a magnetic induction scheme, and an electromagnetic scheme, and an additional circuit for wireless charging, such as a coil loop circuit, a resonance circuit, a rectifier circuit, and the like may be added. The battery gauge may measure, for example, the remaining amount of the battery 1796, and a voltage, a current, or a temperature during charging. The battery 1796 may include, for example, a rechargeable battery and/or a solar battery.

The indicator 1797 may display a specific status, for example, a booting status, a message status, a charging status, of the electronic apparatus 1701 or a part thereof, for example, the AP 1710. The motor 1798 may convert an electric signal to a mechanical vibration, and generate a vibration, a haptic effect, and the like. Although not shown, the electronic apparatus 1701 may include a processing unit, e.g., a GPU, for supporting a mobile TV function. The processing unit for supporting the mobile TV function may process media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of an electronic device. The electronic device 100 may include at least one of the above-described component elements, and some component elements may be omitted or an additional component element may be added. Further, some of the components of the electronic device 100, according to the various embodiments of the present disclosure, may be combined to form a single entity, and thus, may equivalently execute functions of the corresponding elements prior to the combination.

The terms "module" and "means" used in the present disclosure may refer to, for example, a unit including one or more combinations of hardware, software, and firmware. The "module" and/or "means" may be interchangeably used with, for example, the term "unit", "logic", "logical block", "component", or "circuit". The "module" and/or "means" may be a minimum unit of an integrated component element or a part thereof. The "module" and/or "means" may be a minimum unit for performing one or more functions or a part thereof. The "module" and/or "means" may be mechanically or electronically implemented. For example, the "module" and/or "means", according to the present disclosure, may include at least one of an application-specific IC (ASIC) chip, a field-programmable gate array (FPGA), and a programmable-logic device for performing operations which has been known or are to be developed hereinafter.

According to various embodiments, at least some of the devices, for example, modules or functions thereof, or the method, for example, operations, according to the present disclosure may be implemented by a command stored in a computer-readable storage medium in a programming module form. When he command is executed by one or more processors, for example, the processor 120, the one or more processors may execute a function corresponding to the command. The computer-readable storage medium may be, for example, the memory 130.

The computer readable recoding medium may include magnetic media, such as a hard disk, a floppy disk and a magnetic tape, optical media, such as a compact disc ROM (CD-ROM) and a digital versatile disc (DVD), magneto-optical media, such as a floptical disk, and a hardware device specially configured to store and execute a program instruction, for example, a programming module, such as a ROM, a RAM, a flash memory, and the like In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium stores commands, which are set so that one or more processors perform one or more processes when the commands are executed by the one or more processors, and include obtaining information about a region in which the electronic apparatus is located, obtaining an image through an image sensor included in the electronic apparatus, identifying location information about one or more objects included in the image, and identifying a location of the electronic apparatus by using the information about the region and the location information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of identifying a location of an electronic apparatus, the method comprising:
   obtaining information about a region in which the electronic apparatus is located;
   obtaining an image through an image sensor included in the electronic apparatus;
   identifying location information about a plurality of objects included in the image; and
   identifying a location of the electronic apparatus by using the information about the region and the location information about the plurality of objects,
   wherein the identifying of the location information about the plurality of objects comprises identifying a distance and an angle between each of the plurality of objects based on the image, the location information about the plurality of objects comprising the identified distance and the identified angle, and
   wherein the angle is identified based on a location of at least three objects among the plurality of objects on the image.

2. The method of claim 1, further comprising:

identifying the region in which the electronic apparatus is located based on one or more signals transmitted or received between the electronic apparatus and a base station.

3. The method of claim 1, wherein the information about the region comprises map data corresponding to the region and point of interest (POI) information included in the map data.

4. The method of claim 3, further comprising:
selecting the plurality of objects from among an entirety of objects extracted from the image based on the information about the region.

5. The method of claim 4, wherein the selecting of the plurality of objects comprises:
extracting the entirety of objects included in the image; and
selecting the plurality of objects corresponding to the POI information from the extracted entirety of objects.

6. The method of claim 1, wherein the location information about the plurality of objects further comprises a location of each of the plurality of objects.

7. The method of claim 6, wherein the identifying of the location of the electronic apparatus comprises:
comparing map data included in the information about the region and the location information about the plurality of objects; and
identifying the location of the electronic apparatus based on a result of the comparing of the map data and the location information about the plurality of objects.

8. The method of claim 7, further comprising:
identifying a direction of the electronic apparatus based on the result of the comparing of the map data and the location information about the plurality of objects.

9. The method of claim 8, further comprising:
displaying the identified location and direction of the electronic apparatus.

10. An electronic apparatus, the electronic apparatus comprising:
a transceiver configured to obtain information about a region in which the electronic apparatus is located;
an image sensor configured to obtain an image; and
at least one processor configured to:
identify location information about a plurality of objects included in the image, and
identify a location of the electronic apparatus by using the information about the region and the location information about the plurality of objects,
wherein the identifying of the location information about the plurality of objects comprises identifying a distance and an angle between each of the plurality of objects based on the image, the location information about the plurality of objects comprising the identified distance and the identified angle, and
wherein the angle is identified based on a location of at least three objects among the plurality of objects on the image.

11. The electronic apparatus of claim 10, wherein the at least one processor is further configured to identify the region in which the electronic apparatus is located based on one or more signals transmitted or received with a base station through the transceiver.

12. The electronic apparatus of claim 10, wherein the information about the region comprises map data corresponding to the region and point of interest (POI) information included in the map data.

13. The electronic apparatus of claim 12, wherein the at least one processor is further configured to select the plurality of objects from among an entirety of objects extracted from the image based on the information about the region.

14. The electronic apparatus of claim 13, wherein the at least one processor is further configured to:
extract the entirety of objects included in the image, and
select the plurality of objects corresponding to the POI information from the extracted entirety of objects.

15. The electronic apparatus of claim 10, wherein the location information about the plurality of objects further comprises a location of each of the plurality of objects.

16. The electronic apparatus of claim 15, wherein the at least one processor is further configured to:
compare map data included in the information about the region and the location information about the plurality of objects, and
identify the location of the electronic apparatus based on a result of the compared map data and the location information about the plurality of objects.

17. The electronic apparatus of claim 16, wherein the at least one processor is further configured to identify a direction of the electronic apparatus based on the result of the compared map data and the location information about the plurality of objects.

18. The electronic apparatus of claim 17, wherein the at least one processor is further configured to control a display so as to display the identified location and direction of the electronic apparatus.

19. An operating method of a server for identifying a location of an electronic apparatus, the operating method comprising:
receiving an image from the electronic apparatus;
identifying location information about a plurality of objects included in the image;
identifying a location of the electronic apparatus by using information about a region in which the electronic apparatus is located and the location information about the plurality of objects; and
transmitting the identified location of the electronic apparatus to the electronic apparatus,
wherein the identifying of the location information about the plurality of objects comprises identifying a distance and an angle between each of the plurality of objects based on the image, the location information about the plurality of objects comprising the identified distance and the identified angle, and
wherein the angle is identified based on a location of at least three objects among the plurality of objects on the image.

* * * * *